United States Patent [19]
Sherman

[11] Patent Number: 5,974,236
[45] Date of Patent: *Oct. 26, 1999

[54] DYNAMICALLY RECONFIGURABLE COMMUNICATIONS NETWORK AND METHOD

[75] Inventor: Michael J. Sherman, Newton, Mass.

[73] Assignee: AES Corporation, Peabody, Mass.

[*] Notice: This patent is subject to a terminal disclaimer.

[21] Appl. No.: 08/516,035

[22] Filed: Aug. 17, 1995

Related U.S. Application Data

[63] Continuation-in-part of application No. 08/318,984, Oct. 6, 1994, Pat. No. 5,455,569, which is a continuation of application No. 07/856,254, Mar. 25, 1992, abandoned.

[51] Int. Cl.⁶ .............................. G06F 13/38; G06F 15/17
[52] U.S. Cl. .............................. 395/200.51; 395/200.73; 340/825.02; 370/341; 370/255
[58] Field of Search ................ 395/200.1, 200.12, 395/200.15, 200.16, 200.02, 200.5, 200.51, 200.52, 200.58, 200.72, 200.73, 200.75, 200.79; 370/255, 257, 389, 408, 254, 341, 913, 409; 340/825.02, 825.52, 826, 825.54, 825.44; 455/17, 18, 53.1, 56.1, 54.1

[56] References Cited

U.S. PATENT DOCUMENTS

| | | | |
|---|---|---|---|
| 3,939,417 | 2/1976 | Cannalte et al. | 455/53.1 |
| 4,644,532 | 2/1987 | George et al. | 340/825.52 |
| 4,689,786 | 8/1987 | Sidhu et al. | 370/255 |
| 4,718,109 | 1/1988 | Breeden et al. | 455/56.1 |
| 4,809,362 | 2/1989 | Claus et al. | 340/825.02 |
| 4,827,411 | 5/1989 | Arrowood et al. | 370/254 |
| 4,919,545 | 4/1990 | Yu | 395/200.12 |
| 5,005,014 | 4/1991 | Jasinski | 340/825.44 |
| 5,007,052 | 4/1991 | Flammer | 370/389 |
| 5,111,198 | 5/1992 | Kusmaul | 340/825.52 |
| 5,129,096 | 7/1992 | Burns | 455/18 |
| 5,179,554 | 1/1993 | Lomicka et al. | 370/257 |
| 5,223,968 | 6/1993 | Stringer et al. | 370/409 |
| 5,293,638 | 3/1994 | Sasuta et al. | 455/17 |
| 5,313,464 | 5/1994 | Perlman et al. | 370/254 |
| 5,455,569 | 10/1995 | Sherman et al. | 340/825.02 |
| 5,504,746 | 4/1996 | Meier . | |
| 5,515,509 | 5/1996 | Rom | 395/200.1 |
| 5,633,872 | 5/1997 | Dinkins . | |
| 5,634,011 | 5/1997 | Auerbach et al. | 395/200.15 |

FOREIGN PATENT DOCUMENTS

| | | |
|---|---|---|
| 2016486 | 11/1990 | Canada . |
| 0 401 971 A2 | 12/1990 | European Pat. Off. . |

*Primary Examiner*—Mark H. Rinehart
*Attorney, Agent, or Firm*—Richard J. Birch

[57] ABSTRACT

A wireless, dynamically and autonomously reconfigurable link layered communication network and method. The network self-optimizes communication paths within the network. A plurality of communication nodes form the network with each node having a transceiver for receiving and transmitting messages. Prioritized routing lists to all other nodes are stored at each node and updated. Each communication node can be an origination node and a destination node as well as serving as message repeater nodes.

62 Claims, 8 Drawing Sheets

DYNAMICALLY RECONFIGURABLE COMMUNICATIONS NETWORK AND METHOD

CROSS REFERENCE TO RELATED APPLICATION

The present invention is a continuation-in-part of U.S. application Ser. No. 08/318,984 filed Oct. 6, 1994 by Michael J. Sherman and Timothy S. Tate for A Link Layered Communications Network and Method now U.S. Pat. No. 5,455,569 issued Oct. 3, 1995, which is a continuation of Ser. No. 07/856,254 filed Mar. 25, 1992, now abandoned.

FIELD OF THE INVENTION

The present invention relates to the field of wireless communication networks in general and more specifically in the field of security and emergency communication networks.

BACKGROUND OF THE INVENTION

Wireless communication networks, as well as security and emergency communication networks are well known in the prior art, however, the communication links within the system have a fixed configuration determined during the system's installation. Such systems are described for instance by Burns (U.S. Pat. No. 5,129,096). A system that remedies this lack of flexibility and the lack of autonomous system reconfiguration in response to changes in the environment or to the number of operational communication nodes in a given network was disclosed in the above cited application.

In practical situations, additional network versatility has been found to be highly desirable. For instance, in current link layered wireless networks, messages between subscriber units that are not within a predetermined link hierarchy, namely, the then preferred routing path between any one of the two subscribers units and the central monitoring station does not contain the other subscriber unit, need to be routed through the central monitoring station and thus, a less than optimized routing is utilized. In the present invention apparatus and methods as well as routing algorithms are provided that optimize and update such routing between any two subscribers units in the network.

Under special circumstances, it is also desirable to shift the network's central station functions within a subset of the subscribers units. In the prior art, this required recommissioning of the network to rededicate a new central or command station. This process is time consuming and thus creates excessive network down time, a highly detrimental feature in wireless communication networks. The present invention allows for the autonomous shifting of the network's command functions between a predetermined subset of the network's communication nodes.

Furthermore, prior art security networks can be easily disabled or compromised by determined foes, via intentional jamming and injection into the network of false messages. The present invention increases the wireless communication network's ability to withstand such intentional interferences.

The use of encryption algorithms to increase network security and prevent unauthorized access to messages transmitted in a wireless communication network are well known. However, with the advent of powerful computing platforms, deciphering of encryption algorithms has become more feasible, particularly when sufficient traffic can be analyzed. One way to defeat such deciphering attempts is by changing the encryption algorithms often and in a random manner. However, one must assure that the network in its entirety switches to a new encryption algorithm simultaneously. This is difficult to achieve in a traditional wireless communication network due to the time it takes for messages to be transmitted through the network, and particularly, the time it takes for messages to positively reach remote communication nodes. The instant invention provides a method and apparatus to assure that the shift between encryption algorithms occurs simultaneously in the wireless communication network.

Similarly, the instant invention provides for hybrid communication networks in which localized sub networks, often operating at different transmission frequencies than the master network, but not necessarily so, can be incorporated into a single network. One such embodiment involves a master network of fixed communication nodes that is used by a sub network of mobile communication nodes to establish a self reconfiguring unified network. Another embodiment allows the incorporation of established networks, let say with older technology, such as nodes having slower modems than currently available, into a master network of state of the art communication nodes, where the modern communication nodes can communicate between themselves at one frequency and act as a central destination to localized older networks operating at other frequencies, thereby creating a single network which is self reconfiguring.

OBJECTS OF THE INVENTION

It is an object of the invention to provide a versatile self-reconfiguring network with or without operator intervention, a wireless communication network, capable of keeping communication links in the system under variable external conditions, including the addition and deletion of communication nodes as well as maintain communications in the presence of natural and man made interferences.

It is another object of this invention to provide such a network where the communication paths between any two subscriber units are enabled and kept optimized at all times.

It is another object of the invention to provide a wireless communication network where a sub group of at least one communication node acts as a central communication node.

It is yet another object of the invention to provide such a network with the capability to transfer the central station function of the network between a sub set of subscriber units.

It is yet another object of the invention to provide a self-reconfiguring wireless communication network in which a sub set of subscriber units can be mobile, or a communication network comprising of a plurality of sub networks that are consolidated into a single communication network.

It is still another object of the invention to provide a secure wireless communication network in which the messages transmitted can be encrypted and the encryption codes changed simultaneously within the network and provide for message's source authentication.

SUMMARY OF THE INVENTION

The present invention is a "wireless" i.e., non hardwired, dynamically and autonomously reconfigurable link layered communication network and a method to self-optimize, on a continuous basis, the communication paths within the network. The network comprises a plurality of communication nodes, each communication node having means to receive and transmit messages and means to store and update prioritized routing lists to all other nodes. Each communication node can be an "origination node" and a "destination node". The nodes can also serve as "message repeaters" nodes. In some embodiments of the invention all the communication nodes can act as repeaters or retransmitting nodes, while in other embodiments of the invention, particularly, when a network comprises both mobile and stationary nodes, the mobile nodes act only as origination and destination nodes but not as repeating nodes. In yet another embodiment of the invention, only a subset of the communication nodes can act as destination nodes, and when this subset comprises a single node, this node is the network's central transceiver. In yet another embodiment of the invention the functions of the central transceivers can be transferred between a preselected sub set of the communication nodes.

BRIEF DESCRIPTION OF THE DRAWINGS

The objects and features of the instant invention will best be understood from a detailed description of the invention as shown in the accompanying drawings in which.

SPECIFIC DESCRIPTION

Figure 1:
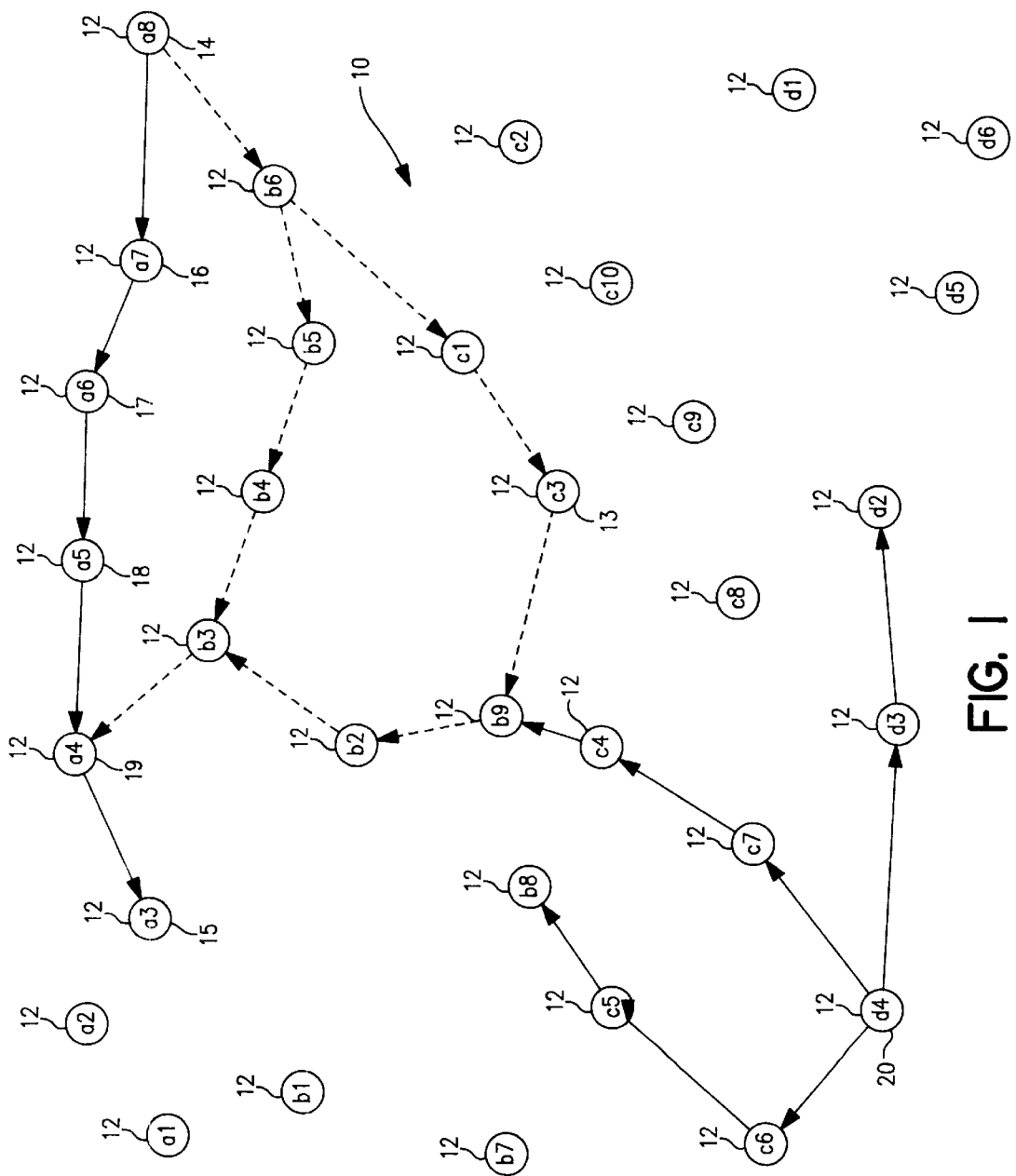
FIG. 1, is a diagrammatic description of a wireless link layered communication network in which each transceiver can communicate with all other transceivers while the routing of such communication nodes is optimized on a continuous basis.

A general dynamically reconfigurable wireless communication network, 10, is schematically shown in FIG. 1. The term "wireless" is used herein to cover all communication networks in which the communication paths between communication nodes are non wired, and thus not permanent, such as radio, microwave, sonar and light communication networks. The network comprises a plurality of communication nodes, 12, each communication node having, at least, a data controller and a transceiver as described in FIG. 2 and in more detail below.

To facilitate the following discussion, the following nomenclature will be used hereinafter. An "originating node" is any of the communication nodes that is the source of a message transmitted through the network. A "destination node" is any communication node to which a data message is addressed. A "retransmitting" or "repeater node" is any communication node in the network that retransmits messages addressed to a destination node (which is not itself). Finally, the words "transceiver" and "communication node" are used interchangeably.

Examining again the network depicted in FIG. 1, each transceiver, 12, is assigned a permanent and unique identification, j, for instance, a serial number, a letter, a unique binary code, or a combination of a letter and a number. Thus, as an illustration, in FIG. 1, the communication node, 13, has a unique identification j=c3. Transmissions of messages in the network are carried out in a link layered manner, namely, for a message to reach a remote communication node, it is transmitted through a number of intermediate communication nodes. As an example, when a message needs to be transmitted from the originating node with the permanent identification j=a8 (14 in FIG. 1) to the destination node with the unique identification i=a3 (15 in FIG. 1), the message is retransmitted through a number of retransmitting nodes, for instance, the nodes a7, a6, a5 and a4 (labelled respectively, 16, 17, 18, and 19). The definition of a link layer level $x_{j,i}$ is the minimum number of transmissions required to convey a message from the originating node j, to the destination node i, thus as depicted in FIG. 1, $x_{a8,a3}=5$. Each of the transmitters in the sequence a7, a6, a5 and a4 (16, 17 18 and 19 in FIG. 1) are assigned their own respective link layer levels, $x_{k,i}$, (k being the transmitters unique indentifications), which are respectively, in this case: $x_{a7,a3}=4$, $x_{a6,a3}=3$, $x_{a5,a3}=2$ and $x_{a4,a3}=1$. It should be clear that the link layer level $x_{i,i}$ is always zero. At each communication node, j, the data controller maintains an updated set of routing lists, $R_{j,i}$, where i is any of the other communication nodes in the network. Thus, if at any time, there are N communication nodes (that are "allowed" destinations) in the network, there will be maintained at the communication node, j, N-1 routing lists $R_{j,i}$, where the destination's identification i can be any of the other communication nodes' unique identifications. The routing list $R_{j,i}$ consists of the ordered unique identification of the transceivers used to retransmit a message from transceiver j to transceiver i. For instance, examining again FIG. 1, and considering the communication node 20 having a unique identification d4. The routing list $R_{d4,b9}$ consists of the ordered set (c7,c4,b9), and the link layer levels $x_{k,b9}$ of the elements in the set (which are communication nodes' unique identifications) from a monotonically declining set of whole numbers, in which the difference in the link layer levels between adjacent members of the set is exactly 1, with the last element, b9 having a link layer level $x_{b9,b9}=0$. Similar routing lists $R_{d4,b8}$, $R_{d4,c5}$ and $R_{d4,d2}$ consist respectively of the ordered sets (c6,c5,b8), (c6,c5) and (d3,d2). One can easily appreciate that the number of elements in the set of a routing list $R_{j,i}$ is the link layer level $x_{j,i}$, since the difference between two adjacent nodes' link layer levels is 1 and the destination node's link layer level, $x_{i,i}$ is always zero.

It will be appreciated that the relationship: $R_{j,m}+R_{m,i}=R_{j,i}$ is always valid in the system's hierarchy created in the invention, where m is the unique identification of an intermediate communication node. Similarly the relationship: $x_{j,m}+x_{m,i}=x_{j,i}$ is also maintained at any time. One should note that the notation $R_{j,m}+R_{m,i}$ means a set containing all the elements in $R_{j,m}$ to which the set of all the elements contained in $R_{m,i}$ was added with their respective orders maintained in the sum routing. Similarly, the substraction of two routing lists obeys similar rules. One can easily verify that $R_{m,i}=R_{j,i}-R_{j,m}$ and $R_{m,n}=R_{j,i}-R_{j,m}-R_{n,i}$, where m and n are the unique identification of repeating communication nodes in that the route $R_{j,i}$, and where $x_{m,i}>x_{n,i}$. Similarly, the link layer levels obey the corresponding relationships: $x_{m,i}=x_{j,i}-x_{j,m}$, and $x_{m,n}=x_{j,i}-x_{j,m}-x_{n,i}$.

For each transceiver having a unique identification, j, a master list, $M_j$, is defined which contains the unique identifications, k, of all transceivers in the network for which the link layer levels $x_{j,k}=1$. This list contains all transceivers that can communicate directly with the transceiver having the unique identification, j. The term "pair" of communication nodes is defined as a set of two communication nodes consisting of one of the transceivers in $M_j$ and j itself. When the data controller at a transceiver having a unique identification j formats a message for transmission, the list $M_j$ is always included in the message, as explained below, or, alternatively, the set of all the routings $R_{m,n}$ can be included, and as explained below, a smaller subset of $R_{m,n}$, the routings $R_{j,i}$ from the transceiver to any other transceiver having a unique identification i is included in the message.

In some embodiments of the instant invention it is desirable to limit the communication nodes that can act as destination nodes i to a subset of at least one such communication node.

Figure 2:
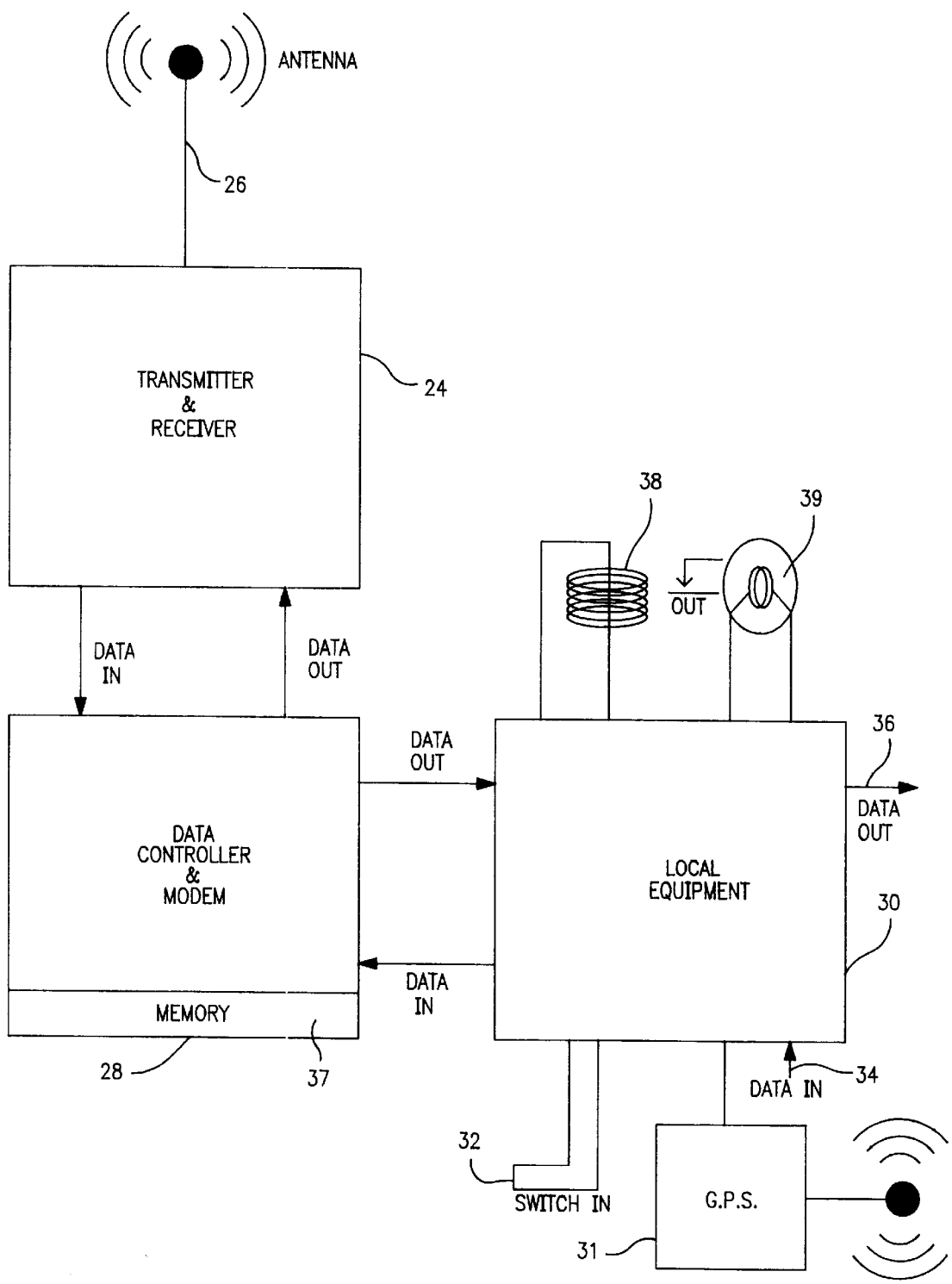
FIG. 2, is a block diagram of a typical communication node.

FIG. 2 shows a block diagram of a typical communication node, 12, and its associated local equipment. The communication node comprises a transmitter and receiver, 24 that can transmit and receive messages and acknowledgments, or data in general through antenna 26. The data controller 28, includes a modem and has a data processing device and associated memory 137 to format messages to be sent by the transceiver 24 and to analyze received messages and acknowledgments received through the transceiver 24. The data controller is also connected to local equipment 30. Depending on the specific application, the local equipment provides for inputting information through a variety of input ports shown illustratively as switch 32 and data line input 34. Such inputs can be for instance, data from sensors and monitoring equipment, digitized (compressed) video images from image capturing equipment, or even data that are manually entered via special purpose data entry devices.

The local equipment can also include a Global Positioning System (GPS) unit 31 to provide both time and position of the transmitting transceiver. Such GPS units receive signals from an established network of satellites, from which each node can determine its exact position as well as obtain a universal standardized time, these signals are used to implement unique functions in some specific embodiments of the instant invention, as further detailed below. The local equipment can also provide output information as shown by data output port, 36, various relays 38 and visual outputs or indicators 39. It should be obvious that this data output port can be used to modify the controller's software program (28) as well.

In order to convey routing information within the network, structured messages and acknowledgments are transmitted in the system in a unique manner. The general structure of the message is given in FIG. 3. As can be seen, a message, 40, or an acknowledgment, 50, are composed of three main elements, the content, C, of the message (41), a front segment A (42) that contains network hierarchy as well as network management information, and an end segment B, 43, which is a checksum like and/or error correction like data string that is used to assure that the full message was correctly sent and received. The front segment is divided into three main sub segments, 44, 45 and 46. The subsegment 44 contains message routing information, including the unique identification, j, of the message's originating node, the unique identification, i, of the message's destination node and the unique identifications of all transceivers in the route $R_{j,i}$. The subsegment 45 contains the message's unique identification, $m_{j,i}$. This unique identification, as will be seen below, improves the management of information transmitted in the network, and in some unique embodiments of the invention, is used to prevent recognition of the same message as two independent messages, and in other embodiments, is used to provide positive authentication that the message originated within the network and from the specific node, j.

The subsegment 46 contains network information relating to the unique position of the transceiver j, in the network and additional information. In some embodiments this segment contains the then effective list of all the sets $M_i$, where i is the identification of any communication node and $M_i$, their respective master lists as defined above. Alternatively, the segment 46 can contain the then all known routes $R_{m,n}$ between any two transceivers having unique identifications m and n respectively. In yet some other embodiments of the instant invention, the segment 46 can contain all the routing lists $R_{j,i}$, where i are the unique identifications of all other transceivers in the network, as an ordered set of unique identifications (k . . . i) where k is the unique identification of a transceiver having a link layer level $x_{k,i}=x_{j,i}-1$. One can easily appreciate that this list of routings can be shortened by not retaining special routing for transceivers already listed in another routing list as an intermediate transceiver. In other embodiments of the invention, the segment 46 would also contain GPS information, including time and position during the first transmission of the message, as well as encryption algorithms information, E, as is further discussed below.

In yet other embodiments, the segment 46 of the structured message contains the value of the "Repeater Function" R, which can have one of two values, for instance "On" or "Off". This function is used in special communication networks that contain subsets of communication nodes that for one reason or another, their inclusion in the network as repeater nodes need to be modified in time. Some examples of such networks are further detailed below.

Figure 3:
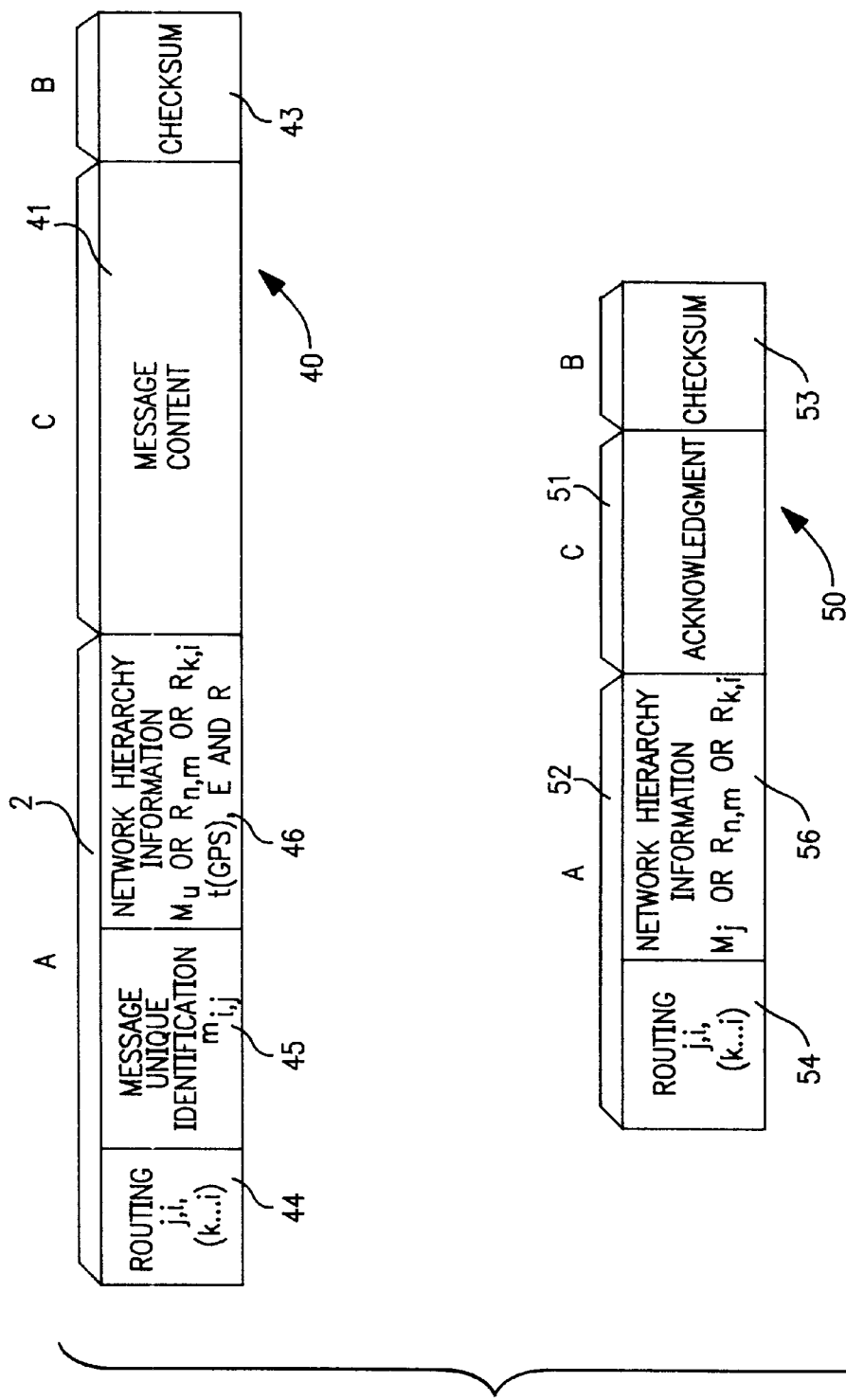
FIG. 3, is a diagram of a structured message used in the wireless communication network of the instant invention.

The "Acknowledgement" as well as "Reply" data messages (DMG's) 50 can have exactly the same structure as the original message or a shortened version to reduce traffic as shown in FIG. 3. The message ID, while repeated, indicates the message is an acknowledgment or a Reply. It should be noted here and in the following that routing for Acknowledgements and Replies DMG's is always inverse to that of standard messages in the network, since they are responses to original messages, thus, while a standard messages from an originating node j, to a destination node i, will be repeated by communication nodes having link layers levels $x_{n,i}$ that are progressively lower until they reach zero at the destination ($x_{i,i}=0$), Acknowledgements and Replies DMG's use the same routing as the original message inversely, thus any transceiver k sending an Acknowledgment or a Reply to an originating node j must have its link layer level $x_{k,i}$, obey the relationship $x_{k,i}<x_{j,i}$ if the communication node having a unique identification j is to receive such Acknowledgment or Reply. Similarly, standard messages and Request for Reply DMG's originating at j and being transmitted through or to a communication node having a unique identification k, must obey the same relationship. In other words, messages and Request for Replies must always be directed to communication nodes with lower link layer levels, while Acknowledgments and Replies are always directed to communication nodes having higher link layer levels.

Figure 4:
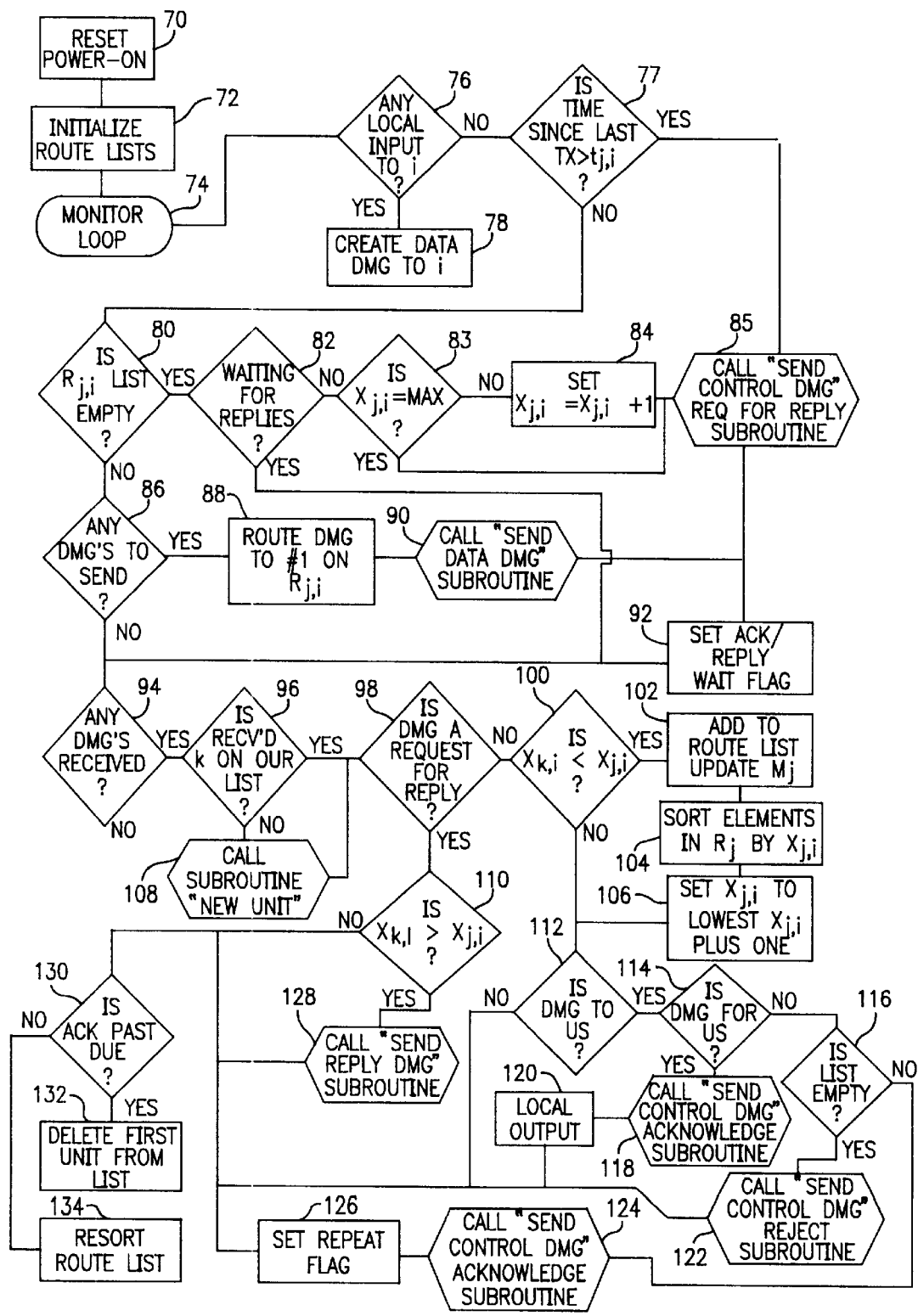
FIG. 4, is a block diagram of the operation of a typical communication node.

FIG. 4 is a flow diagram of the operation of a remote communication node 12, and let its unique identification be j. The entry point is the Reset/Power On 70. The routing is initialized at 72. If this is a new unit, namely, a unit powered up for the first time or a repowered unit, it sets its link layer level to any other transceiver to a maximum value (determined during commissioning of the system and depending on the network's size and other parameters). If the unit is repowered, and was in service prior to such repowering, the last routing list to each of the communication nodes is still stored in the data controller's memory, 37, for as long as the battery back up (not shown) can maintain this memory. In any event, the program, as shown below, will automatically update these routing lists as soon as communications in the system are restored. After initialization, the unit monitors the loop at 74, for any data messages (DMG's), as well as the local system for any input at 76.

Consider first the situation of a transceiver j having a local input. This means that a message to a specific communication node having a unique identification i, needs to be sent. Such a message is created at 78. The data controller then checks at 80 if the routing list $R_{j,i}$ is empty. If it is not (selection of "NO"), it proceeds to check if any DMG's need to be sent (at 86), and in this case, the selection is "YES". It should be mentioned that decision box 86 also checks if any DMG's have been received that require to be retransmitted by communication node, j. One should note that this flag can also be set by block 126. Thus, whether the controller needs to send a DMG formatted at block 78, or retransmit an incoming DMG to a remote communication node, i, the DMG is directed to the first communication node on the routing list $R_{j,i}$ at 88, and the subroutine "Send Data DMG" is called. An "Acknowledgment Wait Flag" is set at 92 and the controller then goes to block 130 (after passing through decision box 94 as explained below) where it checks for the receipt of the Acknowledgment. If the Acknowledgement is not past due, the controller selects "NO" at decision box 130, the cycle for this specific transmission is complete and the controller goes back to monitor the loop at 74. If the Acknowledgment is not received after a certain delay, it is assumed that the transmission was unsuccessful. If desired, multiple retransmissions can be attempted before declaring failure to communicate with the unit at the top of the routing list $R_{j,i}$ and proceeding at block 132 to delete this unit from the routing list.

Consider now the situation where no local input is provided, namely no message to any other communication node, i, needs to be sent. This situation includes the special case of a completely new communication node j, whose data controller has no information on any other communication nodes, i. The data controller selects "NO" at decision box 76. An optional decision box 77 is provided where the controller checks for each other communication node i, whether a transmission has been sent to it or received from it. This feature will be explained in more detail below.

For the present assume that the time since last transmission (TX) has not exceeded the predetermined time $t_{j,i}$, thus the controller selects "NO" and continues to the decision box 80, where it finds out whether any of the routing lists is empty. If any of the routing lists is empty, or if the data controller has no information on other transceivers in the system (and thus the routing list is empty), the controller selects "YES" at decision box 80, and proceeds to decision box 82, where it checks if the system is waiting for a reply to a prior Request for Reply. This assures that the transceiver does not continuously transmit Requests for Replies. If this is the first attempt at requesting a reply (namely establishing communication routes with the rest of the network), "NO" is selected at 82. At 83 a check is made to determine if $x_{j,i}$ is at maximum. If it is, the subroutine "Send Control DMG" Request for Reply at 85 is called. If it is not the data controller attempts to establish a routing list to another communication node i, to which it has no longer a routing list $R_{j,i}$. The data controller increases its link layer level $x_{j,i}$ by 1 and calls the subroutine "Send Control DMG" Request for Reply. This raises the current link layer level $x_{j,i}$ of communication node j relative to i and allows routing through other transceivers, k, that were not accessible before, since they had a link layers $x_{k,i}$ equal or larger than $x_{j,i}$.

To establish such a new route, the controller at 85 calls the "Send Control DMG" Request for Reply and set the Ack/Reply waiting flag at 92. If a reply from a communication node, k, with a link layer level $x_{k,i}$ lower than the new link layer level $x_{j,i}$ is received, the routing list at 80 will no longer be empty, and thus messages can be sent as described above through the decision box 86 and through 88 and 90. To illustrate this situation, refer back to FIG. 1, and let the originating node, j, be the communication node a8 (14), and the destination node i, be the communication node a3 (15). $R_{j,i}$ is the set (a7, a6, a5, a4, a3) and $x_{j,i}$=5. If anything happened to any of the communication nodes a7, a6 or a5, the route $R_{j,i}$ will become invalid. In the prior art, such failure would require the intervention of an operator to establish a new routing list between a8 and a3. One can easily see that by increasing the link layer level of a8 to $x_{j,i}$=6, it can now transfer messages through b6 which has a link layer level $x_{b6,a3}$=5, thus creating a new routing list $R_{j,i}$ as the set (b6, b5, b4, b3, a4, a3).

Consider now the situation where the communication node, j, is a newly powered up unit and its controller has no information on any of the other communication nodes in the network. The unique structure of the messages used in the invention in conjunction with the hierarchy algorithm embedded in the data controllers of the communication nodes allows for the automatic establishment of all necessary routing lists at the new communication node and the updating of the routing lists of the other communication nodes to include the new communication node in the system, as shown below.

Referring again to FIG. 4, the entry point for the flow diagram is Reset/Power On at 70, and initialization of routing lists at 72. Since the new communication node j, has no routing list, the link layer level of the unit is set at a maximum number. The loop at 74 is monitored, and since the unit's data controller has no knowledge of any other communication node, i, in the network, there will be no local inputs of messages to be sent to any other communication node, i, in the system. Since the routing list is empty, "YES" is selected at 80, and at 83, thus leaving the link layer level at the aforementioned maximum value and then at 85, the subroutine "Send Control DMG" Request for Reply is called.

It should be mentioned here, that the Request for Reply will be addressed to any communication node i that can receive the request, thus the DMG segment 44 in FIG. 3 will not have a routing. DMG's that have no routing in their segment 44 are treated by all receiving communication nodes as if the DMG were addressed to all such receiving communication nodes. At 92 the Acknowledgment/Reply Wait Flag is set. If the new communication node, j, is within range of other communication nodes, the Request for Reply DMG will be intercepted by some of these communication nodes, and at least one of such communication nodes will send a reply. Thus at 94, in response to the query "Any DMG's Received", the controller at j will select "YES" and the message will be analyzed to find out the unique identification, k, of the replying unit. At 96, in response to the query "Is Received k On Our List", the controller will select "NO", since at this time, the new communication node's list of other communication nodes in the network is empty, and the controller will call the subroutine "New Unit".

As mentioned above, the received DMG at 94, has a unique structure as described in FIG. 3, whereby segment 46 contains information on the originating unit's position in the network, as well as information on all other units in the network. For instance, segment 46 of the message contains all the master lists $M_u$, where u is the unique identification of any other communication node then recognized in the network.

Figure 5:
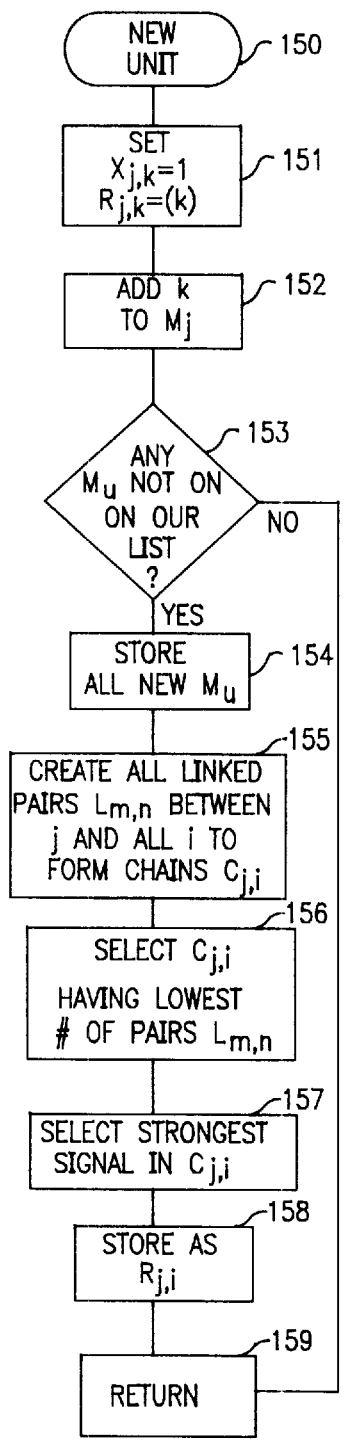
FIGS. 5, 6 and 7 are block diagrams of alternative algorithms used to incorporate new units or sub networks into an existing network.

FIG. 5, shows an example of the subroutine "New Unit", 150, used at 108 (FIG. 4). The data controller at the receiving unit having a unique identification j, first step $x_{j,k}=1$ and $R_{j,k}=(k)$ at 151. Since the data controller has identified k as a unit not previously on its list and has just received a DMG from k, thus at 152, it adds the sending unit k to its own $M_j$ list, given that $x_{j,k}=1$. The controller then queries at 153 the segment 46 in FIG. 3 to see if any $M_u$ is not on its own list of all $M_j$. If the communication node k is a new unit not incorporated in the (j) receiving unit's network, there will not be any $M_u$ in its DMG's segment 46, and the controller selects "NO" at 153 and at 159 and the controller returns to decision box 98 in FIG. 4. If, however, the DMG's segment 46 received by j at 94 in FIG. 4, has any $M_u$ that is not on the receiving node's list of all $M_j$, the controller selects "YES" at 153 and stores in memory 37 at 154 all such new $M_u$ in its own list of all $M_j$. This would be the case if the receiving node, j, is a new communication node, freshly powered up, or if a sending communication node, k, is part of a sub network that includes the sending communication node k that was previously not part of the communication network including the receiving node j. This feature allows for the incorporation in a given network a completely independent network with all its communication nodes, through a single communication between these networks.

Now that the data controller at the receiving communication node j has an updated list of all $M_j$, it utilizes a special algorithm at 155 and 156 to create all possible routings $R_{j,i}$ from j to i. This is accomplished by looking at all the sets $M_u=(\ldots n \ldots)$ and finding first which $M_u$ and $M_v=(\ldots n \ldots)$ have one or more common elements. If $M_u$ and $M_v$ have a common element n, then the controller creates the linked pairs, $L_{u,v}=[\{u,n\}; \{n,v\}]$, and thus establishes a routing list $R_{u,v}=(n,v)$ as well as the routing list $R_{v,u}=(n,u)$. It is evident that linked pairs are characterized by the fact that the last node of the first pair is the first node of the second pair, in this case, the node with the unique identification, n.

In order to establish a given route $R_{j,i}$ (or $R_{i,j}$) between the local node j and a remote node i, all the linked pairs are arranged into chains, $C_{j,i}$ of linked pairs in such a manner that the front of the chain contains a pair of j and an element from $M_j$ and the last element a pair of an element from $M_i$ and i, and each pair in $c_{j,i}$ forms linked pairs with the pair preceding and following it, namely: $C_{j,i}=[\{j,u\}; \{u,n\}; \{n,.\}; \ldots; \{.,m\}; \{m,s\}; \{s,i\}]$. It be appreciated that the chains $c_{j,i}$ represent each a possible routing $R_{j,i}=(u,n,\ldots,m,s,i)$ between j and i, since the pairs $\{u,n\}$ and $\{n,v\}$ in linked pairs $L_{u,v}$ are characterized by the fact that the link layer levels within a pair is always 1, and thus the link layer levels between adjacent nodes in such $R_{j,i}$ is also exactly one. It can be seen that to obtain a routing $R_{j,i}$ from a chain $C_{j,i}$, all one need to do is to create a set consisting of the ordered last elements (unique identifications) in the chan $C_{j,i}$. Any given chain, $C_{j,i}$, however, is not necessarily the shortest route (namely the one with minimal number of message repetitions), and therefore the controller at 156, selects from all $C_{j,i}$ created at 155, those chains $C'_{j,i}$ having the minimum number of pairs. The resulting $R_{j,i}$'s are stored at the data controller of the communication node together with the link layer levels $x_{j,i}$.

One can easily verify that $x_{j,i}$ equal the number of pairs in $C'_{j,i}$ and the number of unique identifications in the routing list $R_{j,i}$. In the trivial case where i is a unique identification in $M_j$, the routing list $R_{j,i}=(i)$ and $x_{j,i}=1$. If more than one chain has the same minimal number of pairs $L_{u,v}$, the system randomly selects a chain, or, in some embodiments of the invention, the chain selected at 157 is the one in which the signal strength from nodes in $M_j$ is the strongest (from all nodes for which $x_{j,k}=1$ that belong to a pair $L_{j,k}$ in the $C_{j,i}$ selected at 156). This $R_{j,i}$ is now stored in the data controller at 158 as the top of the routing list and the data controller returns at 159 to decision box 98 in FIG. 4.

Figure 6:
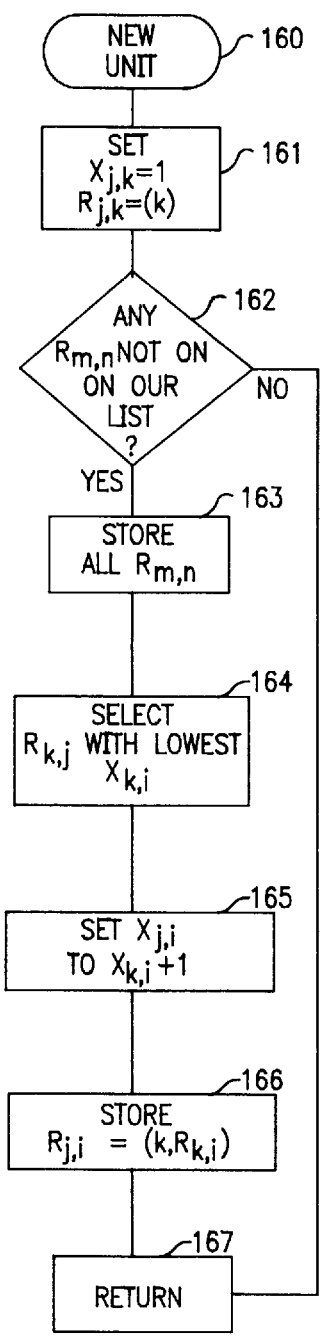
Figure 7:
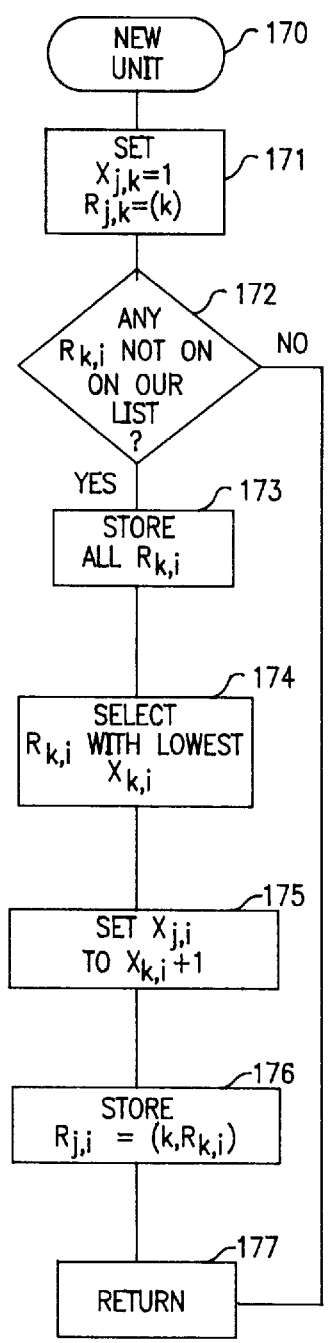

In an alternative embodiment of the instant invention, the "New Unit" subroutine called at 108, can take the form shown in FIG. 6 or FIG. 7. Specifically, the preferred set of data on the network stored in segment 46 of the uniquely structured DMG, contains the then all known routes $R_{m,n}$ in the network. The data controller of the receiving node, j (having received a DMG at 94 in FIG. 4 from a unit having a unique identification k, not on the receiving node's list), after having set its own link layer level $x_{j,i}=1$, and its routing list $R_{j,k}=(k)$ at 161, queries the DMG's segment 46 to determine if all its $R_{m,n}$ are on j's own routing lists. If the communication node with the unique identification j, is a new node, or freshly powered up and its own controller does not have all the routing lists $R_{m,n}$ stored, then the data controller at j, selects "YES" at decision box 162 and stores all those $R_{m,n}$ (that are not previously stored) in its memory, 37, at 163. For each remote communication node, i, the unit having the unique identification k from which the DMG was received at 94 (FIG. 4) will have routing lists $R_{k,i}$ which would be a sub set of the $R_{m,n}$ stored at 163, and thus at 164, the controller at j selects all the $R_{k,i}$ for which the link layers levels $x_{k,i}$ are the lowest. At 165, the controller at j sets its own set of link layer levels $x_{j,i}$ to $x_{k,i}+1$, and at 166 are stored all the then best routing lists, $R_{j,i}$ from the local transceiver, j, to any remote transceiver, i, as $R_{j,i}=(k,R_{k,i})$. At 167 the system returns back to decision box 98.

A somewhat simplified alternative to the subroutine "New Unit" is shown in FIG. 7, and in this case, segment 46 of the DMG (in FIG. 3) contains only routing lists from the sending transceiver with the unique identification k, rather then all the routes feasible in the system. This allows for shortening the non content part of the DMG, yet provides essentially all necessary routing from the transceiver j, that has just received the DMG. In this embodiment, decision box 172 (the equivalent of 162 in FIG. 6) queries segment 46 in the DMG only for the routing lists from transceiver k, and by adding to each such route $R_{k,i}$ the unique identification of k, obtains the list of $R'_{j,i}=R_{j,k}+R_{k,i}=(k, R_{k,i})$ which is compared to the receiving transceiver, j, routing list $R_{j,i}$. If all $R'_{j,i}$ are already stored in the data controller of the j unit, the controller selects at decision box 172 "NO" and returns to decision box 98 in FIG. 4. This would be the case when the unit k was non operational only for a short time and all its routings from j to any other i where still in the data controller's memory 37. If, however, j itself is a completely new unit, or a unit in which only a partial list of all other transceivers resided, or if the sending unit k is part of a secondary network previously not incorporated within the network that the receiving unit j operates within, then the data controller would select "YES" at decision box 172 and proceed to store all new $R_{k,i}$ at 173 and build a set of routing lists $R_{j,i}$ in a manner parallel to that described in FIG. 6.

It should be clear that the subroutines "New Unit" described in FIGS. 6 and 7 can also contain the selection of a preferred routing list when a number of routing lists have the same number of elements within them, as shown in FIG. 5 at 157. One should also appreciate that due to the relationships: $R_{j,i}=R_{j,m}+R_{m,i}$, $R_{m,i}=R_{j,i}-R_{j,m}$ and $R_{m,n}=R_{j,i}-R_{j,m}-R_{n,i}$, where m and n are the unique identification of repeating communication nodes in the route $R_{j,i}$, it is not necessary at block 163 (FIG. 6) and block 173 (FIG. 7) to store all possible $R_{m,n}$ and $R_{k,i}$, but only a sub set of routes that includes all the unique identification of the communication nodes in the network. This, since a route $R_{m,n}$ is an ordered set of unique identifications, as described above, and if the sub set $\{R_{m,n}, \ldots, R_{q,s}\}$ contains each unique identification, i, in the network at least once, all the routes in the system can be derived by addition and substraction.

Referring again to FIG. 4, the received DMG was either from a known sending communication node, k, or from a previously not included communication node k. In the latter case, the subroutine "New Unit" at 108 returned to the decision box 98, and in the former case, the selection "NO" at decision box 96 directed to decision box 98. This decision box checks the received DMG to see if it is a request for reply. If it is not, "NO" is selected at decision box 98, and the link layer level of the communication node k relative to the message destination i, namely, $x_{k,i}$ is checked against the link layer level $x_{j,i}$ of the receiving communication node j, relative to the same destination node i to which the message is destined at decision box 100.

Under normal operating conditions, since the message is not a Request for Reply, it should be further transmitted (or repeated) toward its destination, i, or the message might be for the communication node j itself. In both cases, it could come only from a communication node, k, having a link layer level $x_{k,i}>x_{j,i}$, or for the latter case (i=j), $x_{k,j}>0=x_{j,j}$, and the controller would in this case select "NO" at decision box 100. If, however, $x_{k,i}<x_{j,i}$, this would indicate that conditions in the network have changed and as a result, the communication node k is closer to the destination node i than the receiving communication node j, and the routing must be updated. "YES" is then selected at decision box 100 and at block 102, the communication node k is added to the routing list, and the list $M_j$ is updated (since the communication node's DMG was received at decision box 94, k must have a link layer level $x_{j,k}=1$ and thus, if it was not on the list $M_j$, it must be added to the list). The controller then sorts all the elements l in $M_j$ (which now contains the newly identified communication node k) by their link layer level $x_{l,i}$ at block 104 and sets a new link layer level $x_{j,i}$ to be the lowest $x_{l,i}+1$ at block 106. In most cases, the newly identified communication node (identified as a shorter repeating path to j from i) will be the communication node k from which the message was received at decision box 94. The routing list will now be $R_{j,i}=(l,R_{l,i})$ where l is the unique identification of the communication nodes sorted at block 104 to have the smallest $x_{l,i}$.

The algorithms embedded in the "New Unit" subroutine (block 108) in conjunction with the algorithms implemented in decision boxes 98 and 100 and blocks 102, 103 and 106 cause the automatic updating of the network hierarchy between j and i and thus the then current best routing list to communication node i from communication node j has been automatically maintained. This is achieved without the intervention of an outside operator and derived automatically from information contained in the specially constructed message 40 in FIG. 3.

The controller is now at decision box 112, where the DMG is queried if it is addressed to the local communication node, j. One should note that updating of the routing $R_{j,i}$ can be carried out from messages that are not addressed to the communication node j, and if the DMG received at decision box 94 was such a message, "NO" is selected at decision box 112, and the controller is directed to decision box 130 (to be discussed below). If, however, the DMG was addressed to "us", namely the communication node j, "YES" is selected at 112. The DMG is then either for "us" (namely the communication node j) or is to be retransmitted to a destination other than j namely, a destination i. In the former case, "YES" is selected at decision box 114 and the subroutine "Send Control DMG"/Acknowledge is called at block 118, and the content of the DMG is delivered to local equipment or as a local output at block 120. Any directive to the residing or local controller is also provided here as local output.

After having delivered the DMG's content to the local output, the data controller is directed here as well to decision box 130. If the DMG's destination was not j, but another communication node with a unique identification i, the controller will select "NO" at decision box 114 and attempt to send the DMG further down the communication line. The controller first queries if the routing list $R_{j,i}$ is empty at decision box 116, and if the list is not empty, the "Send Control DMG"/Acknowledge is called at block 124, and the repeat flag is set at 126 (which brings the DMG to the attention of the decision box 86 which then routes the DMG toward the communication node i), and the controller is directed to the decision box 130. If the routing list is empty, the controller will select "YES" at decision box 116, and then call the "Send Control DMG"/Reject Subroutine at block 122, which will inform the communication node k, that the destination node i cannot be reached via the local communication node j. The controller at communication node k will then delete the communication node j from its own routing list and attempt a new routing. The controller is then sent to decision block 130.

Consider now decision box 98 and assume that the received DMG was indeed a Request for Reply. As mentioned earlier, in the hierarchy of the network of the invention, Acknowledgments and Replies are always addressed to communication nodes having higher link layer levels while messages and Requests for Replies are addressed to communication nodes having lower link layer levels. At decision box 110, a check is made to determine if the link layer level of the sending communication node k, $x_{k,i}$, is greater then the link layer level $x_{j,i}$ of the receiving node i. If $x_{k,i}>x_{j,i}$, select "YES" at decision box 110 and call "Send Reply DMG" and then the controller is sent to decision box 130. Note that if the DMG at 94 came from a new unit k, as a Request for Reply, all units in k's range will respond to that request. Since the Reply DMG's all include segment 46, information on the network will be transferred to the new unit k and thus allow unit k to find its correct position within the network. If, however, the relationship $x_{k,i} \leq x_{j,i}$ holds, the controller ignores the DMG altogether, since it is further away from i than k, and thus cannot provide a better communication route to messages from k to i. The controller is then sent to decision block 130 where a decision box queries the system whether Acknowledgment or Replies to prior communications are past due. If such Acknowledgments and Replies were duly received at j, the controller selects "NO" at decision box 130 and returns to monitor the loop at 74. If, however, such Acknowledgments or Replies have not been received, the controller will delete the first unit from its routing list and resort the list, and then return to monitoring the loop at 74. In the latter case, there will still be a pending unsuccessful communication. If there was a Reply past due, this past due Reply would be the request sent at block 85, and thus the list at decision box 80 would still be empty, and therefore a further increase in the communication node j's link layer $x_{j,i}$ would be required at 84. An example of this can can be seen in FIG. 1, when a full geographical zone that includes the communication nodes a6, a7, b4 and b5 is affected for one reason or another, namely, these communication nodes are off, for instance, due to severe weather. In the unaffected network, the link layer level $x_{a8,a3}=5$, while when the cited zone is out of operation, the routing list $R_{a8,a3}$ automatically adapts to the new situation, without operator intervention, by selecting $R_{a8,a3}=$(b6, c1, c3, b9, b2, b3, a4, a3), having a link layer level $x_{a8,a3}=8$. Thus, in this case, the reestablishment of communications between a8 and a3 required three increases of $x_{j,i}$ (where a8=j, and a3=i) at block 84 (see FIG. 4), and for each increase by one, the controller went through the cycle including 74, 77, 80, 82, 83, 84, 85, 92, 94, 130, 132 and 134 blocks and decision boxes, until communications from a8 to a3 with the then best routing were reestablished.

Figure 10:
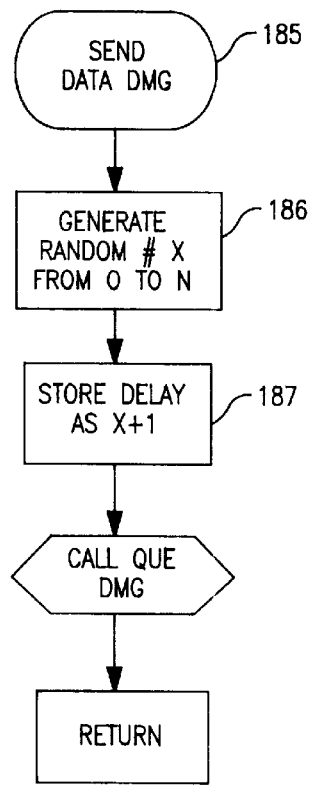
FIGS. 8, 9, 10 and 11 are block diagrams of subroutines used in transmitting messages in the network of the invention; and, FIG. 12, is a diagrammatic description of a wireless link layered communication network consolidated from sub-networks operating at different frequencies from each other.
Figure 11:
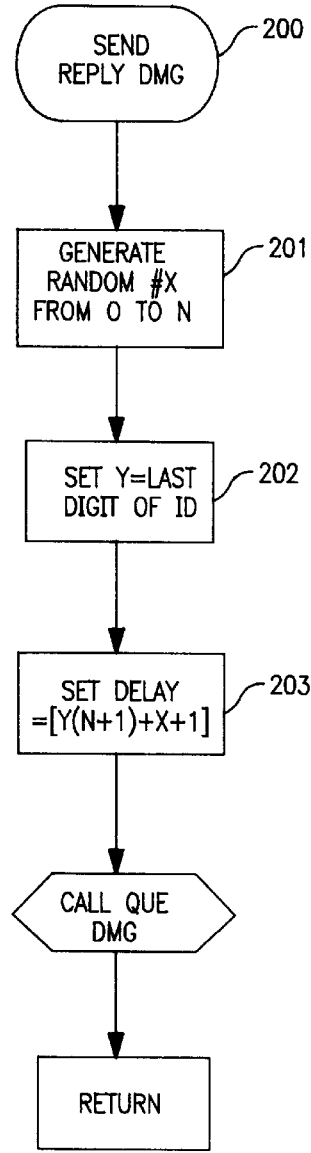
Figure 8:
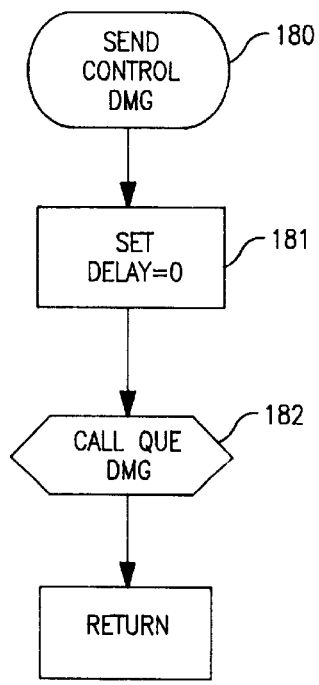
Figure 9:
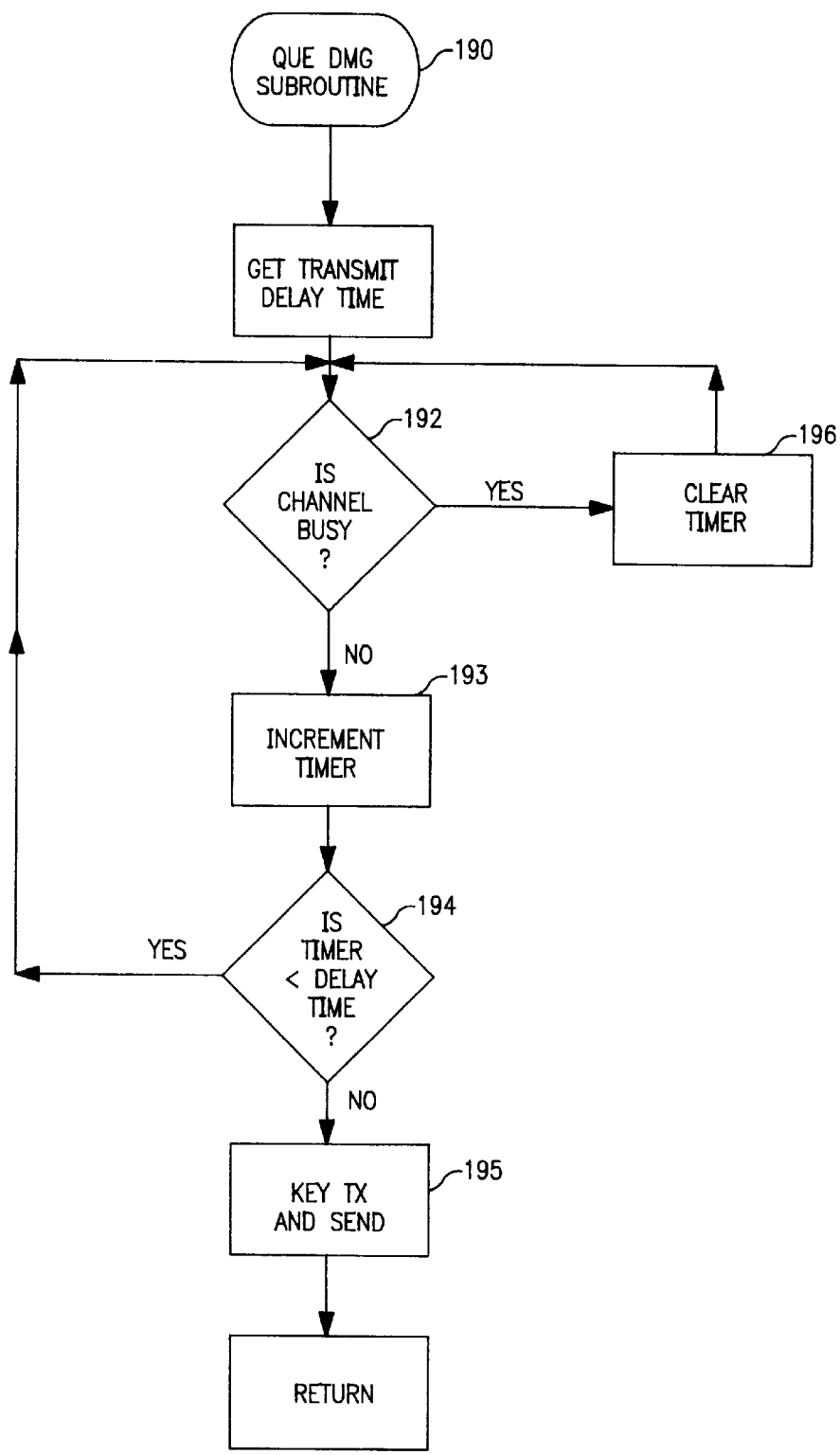

As seen in FIG. 4, there are three major categories of message transmissions. The most urgent type of DMG transmission is named "Control DMG" (at blocks 85, 118, 122 and 124) and is used to transmit "Request for Reply", "Acknowledgment" and "Reject". The second type of DMG is the standard Data DMG and the last type of DMG is a Reply DMG. The subroutines used to transmit these DMG's are shown in FIGS. 8, 10, and 11 respectively, and the sub routing "Que DMG" is shown in FIG. 9. As can be seen in FIG. 8, the "Send Control DMG" 180, starts by setting a delay time of 0 at 181, then the subroutine "Que DMG" at 182 is called. The subroutine "Que DMG", 190 manages the actual forwarding of the formatted DMG. The subroutine first fetches a DMG's delay time at 191, then at decision box 192, it checks if the communication channel is busy or not. If the channel is busy, "YES" is selected and the timer is cleared at 196 and then the subroutine checks the channel again, until it finds the channel free, then the subroutine selects "NO" at decision box 192 and proceeds to increment the time at block 193. The subroutine then ascertains that the delay fetched above is not shorter than the timer at decision box 194 and if the timer is larger than the delay, "NO" is selected at decision box 194 and the transmission is keyed in and sent at block 195. If the timer was shorter than the delay at decision box 194, then the subroutine selects "YES" and returns to check if the channel is busy, for another attempt at transmission. By setting the delay to zero in the "Send Control DMG" 180 subroutine, the high priority of Control DMG's type of transmissions is assured.

On the other hand, the subroutines for the less urgent DMG's, namely the Data DMG (185 in FIG. 10) and the Reply DMG (200 in FIG. 11) contains algorithms at blocks 186 and 187, and at blocks 201, 202 and 203, respectively, that assure non zero delay for these transmissions. This guarantees that if there are any Control DMG's to be sent, these will receive first priority.

The above describes in general terms the operation of a wireless communication network where the communication paths between any two transceivers are continuously optimized and updated from information contained within the messages exchanged in the network. In some applications, the expected traffic in the network can be assumed to be sufficiently large to keep the updating process current at all times. There are, however, many wireless communication networks that are quiescent for relatively long time intervals, and other networks in which a subset of communication nodes are quiescent for long periods. It has been that in such networks, degradation of at least some of the communication paths and loss of communication between some of the communication nodes can occur due to insufficient traffic in the loop to update the network communication paths. Since the essential routing and network structure information is contained in the transmitted DMG's and the paucity of such traffic prevents good dissemination of the information in the network. This problem, can be overcome by forcing the network to create artificial communications, if standard communication density reaches a level below which a loss of system integrity can occur. This is provided by selecting at each communication node j a set of time intervals $t_{j,i}$, that if no communications between j and the communication node having the unique identification, i, occurred for such a time $t_{j,i}$, then a Request for Reply is sent from j to i. Since any communication between j and i requires also a communication between i and j (at least as a series of Acknowledgments of DMG's receipts from all intermediating communication nodes) it is best (but not necessary) to $t_{j,i}=t_{i,j}$. The actual selection of the time intervals $t_{j,i}$ is however, quite arbitrary and depends largely on the circumstances of the specific communication network.

The implementation of this network refreshing procedure is carried out at decision box 77 in FIG. 4. After the data controller has determined at decision box 76 that there are no local inputs at j (to send a message to any communication node i), the controller selecs "NO" at 76 and in decision box 77, the controller checks if the time from the last transmission to a remote communication node i is larger than $t_{j,i}$. If the time lapsed from the last communication to i is shorter than $t_{j,i}$, then as described before, the controller selects at decision box 77 "NO" and proceeds as described above. If, however, the time lapse from the last communication to i is greater that the preset value $t_{j,i}$, the controller selects "YES" at decision box 77 and proceeds to block 85, where the "Send Control DMG"—Request for Reply subroutine is called. If during the interval $t_{j,i}$ changes have occurred in the network between the communication nodes j and i, the algorithms embedded in the communication node's controller will reestablish the best communication route $R_{j,i}$ between j and i from data contained in a received DMG (which will be a Reply DMG).

It will be appreciated that block 120 in FIG. 4 can represent a large number of outputs and activities. Such outputs can be control signals to open or close various switches, reset instrumentation, provide status reports etc. The output can also be data directed to the data controller of the unit j, including data that are not part of segment 46 in FIG. 3. For instances, such data may direct the controller to inhibit the use of a sub set of the communication nodes in the network as destinations i, or conversely, enable a sub set of communication nodes previously inhibited as valid destinations. Furthermore, such data can also be used to designate only a subset of the communication network as repeaters nodes, namely, nodes that can be used for repeating messages from originating nodes to destination nodes. This is particularly important when the wireless communication network contains a sub set of mobile nodes that cannot be relied on to act as repeater nodes due to their constant change in position as is described in more detail in an example below.

One of the functions that can be activated through block 120 of FIG. 4, is the selection, at any time, of communication nodes that can be used as destinations. In some embodiments, one would want to allow only one or a limited number of nodes to act as destination nodes for Data DMG, and changes in the subset of communication nodes that are possible destinations are implemented at each controller at block 120 when the content of a Data DMG so indicates to a given controller.

In one embodiment, each communication node contains as part of its local equipment a GPS unit that provides the local data controller with a universal reference time as well as the position of the communication node. This facility is particularly important when some of the communication nodes in a network are mobile or when encryption algorithms are used in high security systems as described in specific examples below. In this embodiment, the time and position of the local communication node are transmitted with each transmission of the communication node as part of segment 46 of the Data Message in FIG. 3 (denoted as t(GPS) in segment 46), and can be used by the receiving communication node's controller to determine the position of the originating node, or to promulgate through the network specific directives that need to be enforced simultaneously by all nodes. For instance, the output at block 120 of FIG. 4 can include directives to the local controller to shift encryption from one algorithm to another algorithm at a predetermined future time according to a specific key included in the directive or embedded in the controller's encryption algorithm. This information, denoted "E" in 46 (FIG. 3), includes transition time as well as special encryption variables.

In the networks of the invention, at any given time, the number of communication nodes in the network is a constant, N, but this value can increase or decrease as communication nodes are added or deleted from the network. Such additions and deletions can be temporary or permanent. For instance, failure of any given node would remove that node from the network, while the repowering of a previously disabled node or addition of a new node would add a node to the network. Similarly, complete networks can be consolidated into a single network, as will be further described below. The unique feature of the self reconfiguring network of the invention, is that it automatically adapts itself to such changes, without the intervention of an operator, and unlike the aforementioned Patent application, where all messages are transmitted to a unique central transceiver, in the network of the instant invention, messages can be exchanged between any two communication nodes in the network.

The following are some specific examples of adaptive wireless networks and applications that utilize the present invention.

EXAMPLE 1

There are a number of wireless communication networks in which the provisions enabling all communication nodes to communicate with any other communication node is not desired. For instance when a network is controlled by a single central station which also serves as the universal destination i for all the other communication nodes. Such a network is described in the co-pending application #07/856, 254 and would be often used in wireless security communication systems with a single monitoring station. Another application involves a wireless communication system between various points in a building or a plant and a central energy management system or a central process control system.

The wireless communication network described in the invention can be easily converted to a network with a single central destination while initializing the routes at 72, by selecting only the unique identification i of the nominated communication node to be the central destination, and the only destination for all nodes in the network. Such initialization can be accomplished either during Reset/Power-On, namely upon commissioning a new unit or repowering it, or, alternatively, such resetting can be achieved without having to modify communication nodes in the field, but by sending a DMG to all communication nodes to recognize only said central destination with the unique (and now singular) identification i as the only possible destination. This is accomplished by providing a directive within the message content part of the DMG, which at block 120 in FIG. 4, would provide the instruction prohibiting using any communication node as a destination for Data DMG except the node designated as the central transceiver, or central destination. It should be understood that while Data DMG will not be destined only to said central destination, other DMG's such as Control DMG (i.e. Acknowledgment, Request for Reply and Reject) and Reply DMG can still be addressed to any communication node in the system, thus assuring that at any time the system's communication paths are optimized. In such a system, the only Data DMG's that can be addressed to remote (non central) communication nodes are Data DMG's that originate from the designated central communication node.

In a security system, the wireless communication network described in this Example employs a plurality of remote communication nodes in which the local equipment 30, in FIG. 2, comprises various sensors such as, but not limited to, intrusion detectors, surveillance cameras, and various access control devices. Changes in the status of such sensors are signalled to the data controller at each node and formatted as Data DMG's by the controller, to be communicated to a central security station. The central communication node, however, by forwarding Data DMG's to specific remote communication nodes, can reset sensors, activate or deactivate alarm status indicators and actuate any local equipment which can receive signals from the data controller.

In a process control system or an energy management system, the local equipment 30, in FIG. 2 can include various sensors and actuators. The sensors measure process parameters which are formatted as Data DMG by the controller and forwarded via the network to the central process control or energy management system located at the central destination. The controller at the central destination, using a local processor and appropriate process control or energy management algorithms than formats the Data DMG to be forwarded to each remote communication node, which is then converted at block 120 of FIG. 4 to signals which activate, deactivate or control local equipment at the remote destination.

In such a wireless communication network, one may find it advantageous to use infrared communication rather then radio frequency transceivers, particularly when equipment that needs to communicate with each other is in line of sight of each other and apparatus is provided to transfer signals through walls and other building partitions. Such apparatus can be simply the mounting of an infrared transceiver on one side and passing through the wall optical fibers to send and receive infrared signals.

EXAMPLE 2

In another embodiment it is desirable to limit the number of destinations of Data DMG's in a network to a subset of communication nodes and prohibit the transmission of Data DMG's to any communication node not in the subset. Such a system can be for instance, a security network where central monitoring of the subscribers' units are monitored both by the local law enforcement authorities and by a central office of the security services provider, but where it is not desired that the subscribers' units communicate between or among each other, yet provide for system integrity under all conditions and allow the use of lower power transmitters. The distributed subscriber units are used as repeaters of messages between or among remote subscribers and the central monitoring stations. Such a wireless communication network, can also provide the facility to change the designation of "Central Destination" or a plurality of "Central Destinations" between a predetermined number of communication nodes at any time by providing in a message transmitted within the network and to all communication nodes a directive which, at block 120 of FIG. 4, will cause the local data controllers to enable communication of Data DMG's to at least only such newly designated unique identification and prohibit communication of Data Messages to other unique identifications as required. A system as described in this example, where the central monitoring function can be shifted at will between a predetermined subset of the communication nodes, is particularly useful when manning of various central control sites varies in time, such as variations in network configuration between night shift and day shift, or varying network configuration between weekdays and weekends, and even in networks where different seasonal configurations are desired. In all such instances, the flexibility of the network allows for easy reconfiguration and reassignment of the central monitoring functions between different sites, without having to recommission the network.

EXAMPLE 3

In yet another embodiment, the wireless communication network utilizes two subsets of communication nodes. The first subset has all its communication nodes at fixed locations while the second subset cpmproses mobile communication nodes, usually, interspersed between fixed communication nodes. In such a network, the fixed communication nodes are at a sufficiently high density to allow normal communication between all the fixed communication nodes and the mobile nodes are not used as repeaters in the communication network. The mobile communication nodes, however, use the fixed network to communicate with some or all of the fixed communication nodes. This is accomplished by monitoring the loop at the mobile communication node j and obtaining from messages transmitted by fixed nodes through the loop, information on the network, for instance, at decision box 96 in FIG. 4, the mobile communication node j identifies a nearby fixed communication node k, and proceeds to establish a routing $R_{j,i}$ through k by using any of the subroutines described in FIGS. 5, 6 or 7. This routing is used until the mobile communication node moves to another zone where it intercepts messages from another fixed communication node whose signal strength is much greater than that of the first fixed node signal and thus proceeds again with selecting "NO" at decision box 96 and establishes a new routing list $R_{j,i}$. One can also maintain at the mobile communication node j, a list of all routing $R_{k,i}$ where k and i are all the fixed communication nodes in the network, and by monitoring the loop, select the shortest $R_{k,i}$ with the strongest signal to form its own route $R_{j,i}=(k,R_{k,i})$, its then current communication route to i.

To assure that the mobile communication nodes are not included in the fixed network as potential repeaters, the messages transmitted by the mobile communication nodes do not contain in their segment 46 (FIG. 3) any information on their then relative position in the network, namely the messages do not contain lists of $M_j$, or $R_{m,n}$ or $R_{k,i}$ as is the case with the structured messages described in FIG. 3 and used by fixed nodes in the communication network. The lack of these data in the segment 46 is used by other (fixed and mobile) communication nodes to recognize the source of such messages as a non repeating communication node.

It will be appreciated, however, that if a mobile node becomes immobilized for any length of time, and it is desired to include such a, now immobile, node as a repeater and thus part of the fixed network, all that needs to be done is to send a data message to such node which will include a directive which at block 120 in FIG. 4 will cause the node to start and send DMG's containing network hierarchy information in segment 46 of all its messages, and thus be recognized by the network as a potential repeater node.

Another method of accomplishing the activation and deactivation of a communication node's repeating function, is to create a Repeater function R that can take one of two values, "On" or "Off". Functionally this is achieved by providing within the sub segment 46 of the structured message 40 in FIG. 3, a data location that can take the values of 1 or 0. When the mobile communication node is in motion, and thus should not be used as a repeating transceiver, the function R is set to "Off", and all messages from this mobile node carry this label through the system, thus notifying the system to eliminate routing lists that contain the unique identification, m, of this transceiver as a non terminal element. Namely, the mobile communication node can be used as a destination (the terminal element in any routing $R_{j,m}$), but cannot be used as a retransmitter. Any time such a communication node changes its Repeater function status, a message can be formatted to all other communication node which will then update their own routing lists according to the information contained in the message.

EXAMPLE 4

Figure 12:
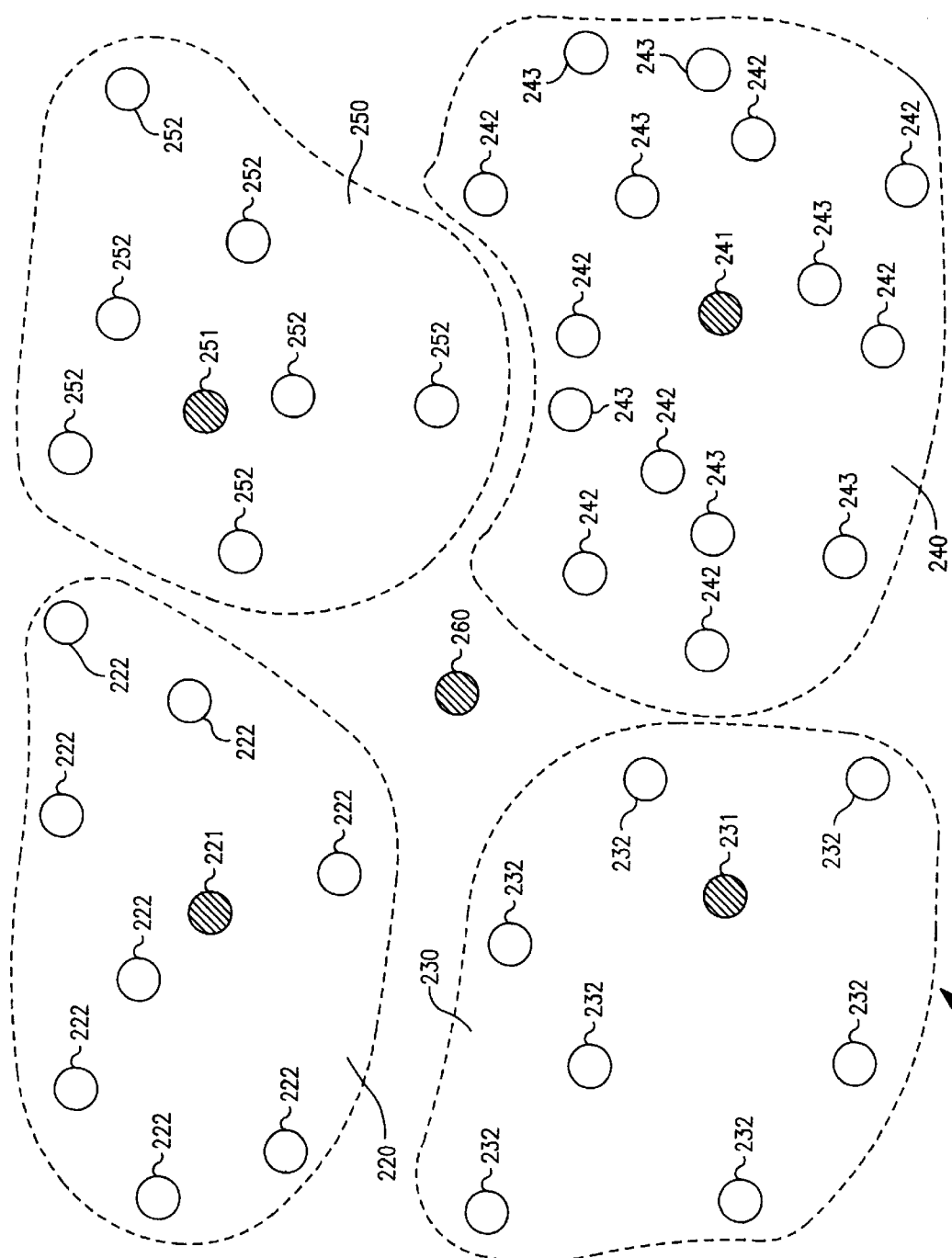

FIG. 12 shows a schematic presentation of another embodiment in which a new integrated communication network, 210 is consolidated from a plurality of smaller networks $N_i$ (in this example, four such sub networks which are labelled 220, 230, 240 and 250 respectively) each having their respective central destination communication nodes $C_i$, 221, 231, 241 and 251, and a plurality of remote communication nodes 222, 232, 242 and 252. The sub networks can operate each at different radio frequencies $f_i$. It should be understood that some of the $f_i$ can be the same frequency. Such a situation can arise when it is desired to consolidate older equipment of independent networks into a single network, 210, with a central communication node (260) without having to replace all the local transmission hardware, or upgrade a system of sub networks to allow communication between all the nodes when the sub networks operate at different frequencies from each other.

In the present invention, each communication node in a sub network can communicate with other communication nodes in the same sub network including the central communication node of the said sub network at its own radio frequency $f_i$. The central communication nodes $C_i$ only, have "frequency agile" transceivers capable of transmitting and receiving DMG's at the sub networks's frequency $f_i$ and at least at another frequency $f_1$. This frequency $f_1$ is used in a principal wireless communication network where the set of communication nodes includes only the central communication nodes, $C_j$, of each of the sub networks. Thus, in this example, if the frequencies of the sub networks are $f_2$, $f_3$, $f_4$ and $f_5$, for sub networks 220, 230, 240 and 250 respectively, the central communication node 221 can hop between the frequencies $f_1$ and the frequency $f_2$. The master network 210 can be provided with an independent central communication node (260) or any of the central communication nodes $C_i$ of the sub networks can be assigned this master network central communication function. Messages between an originating node of one network to a destination node in another network are routed at the originating node sub network's frequency to that sub network's central transceiver, and then the message is routed to the central transceiver of the destination node's sub network at the master network frequency $f_1$ and, finally, the message is routed to the final destination node in the second sub network at that network frequency. Each sub network maintains routing lists between its own communication nodes including its central communication node by using algorithms described earlier. Similarly, the network of central transceivers, the master network maintains its own routing list by similar method. All central transceivers also maintain a master list of all unique identifications of all communication nodes in the single network 210, with, however, a fixed designation of the sub networks to which each communication node belongs.

It should be understood that while the example shown herein contains only four sub networks, system with much larger numbers of sub networks can designed as well. Furthermore, with agile frequency hopping transceivers in the master network, the communication nodes within the master network of agile frequency hopping can serve as repeaters of DMG's from a number of geographically congruent sub networks operating at different sub networks frequencies. An example of such a situation is shown in FIG. 12 where the sub network 240 has two geographically congruent sub networks, one containing communication nodes 242 operating at one frequency and the other containing communication nodes 243 operating at another frequency, and both communication sub networks using the central communication node 241, which is capable of transmitting and receiving DMG the master frequency $f_1$, and at the two frequencies of the congruent sub networks containing the two types of communication nodes 242 and 243.

EXAMPLE 5

Another embodiment is applicable to very high security systems in which it is desired to assure that DMG's and particularly data DMG reach their destination, cannot be read or deciphered by unauthorized entities and it is also desired to prevent the injection of false messages into the network by malicious outsiders. In such a system, the data controller are equipped with encryption algorithms generating circuits and the local equipment each contains a GPS unit. Circuits capable of generating different algorithms are well known in the prior art. With the advent of powerful computing platforms, it is feasible to decipher an encryption algorithm if sufficient communication traffic is available which is all encrypted in the same manner. To defeat such deciphering attempts, one can change the encryption algorithms at sufficiently short intervals, so that such deciphering efforts would fail. However, in current state of the art communication networks, it is difficult to simultaneously change the encryption algorithms in a system in response to a request to do so by a designated transceiver, since it takes a finite time to promulgate such an instruction through the whole network. Time delays in the promulgation of such algorithms in the network will cause parts of the network to operate with the prior algorithm while other parts with the new algorithm.

In the present invention, encryption algorithms are changed in the system simultaneously, and this is achieved, by providing the algorithm's unique key to the system, a short time before such new algorithm goes into effect, and using the universal time signal from the GPS to coordinate change-over in encryption algorithms so that they are simultaneous network wide. The time intervals between encryption algorithm changes can be set at a constant, or can be determined by the traffic density in the network, or can be a complex function of the traffic configuration at any time. Similarly, some key variables in the encryption algorithms can be generated from traffic patterns in the network itself, thus further complicating any potential foe's task of deciphering the encryption algorithm. Such variables are included either in the data string named "E" in segment 46 of the message (FIG. 3), or as part of the message content 41 in the same figure.

In yet another embodiment of highly secure communication networks, intentional jamming by foes is circumvented by dual (or multiple) routing of critical data messages. In this case, the originating node, j, selects from its master list $M_j$ two neighboring nodes having their link layer levels $x_{k,i}$ differ from each other by at least 2, where the unique identifications k are these of two communication nodes in $M_j$, one of which is at the top of the routing list from j to i, and i is the unique identification of the destination node. By such double routing areas in the network that are under foes jamming influence, the influence can be circumvented while still allowing the data DMG to reach its destination i. By providing each message its unique message identification, $m_{j,i}$, if the destination node receives both messages, it will automatically recognize the message as a duplicate message and discard it. The message's unique identification is also used in such high security network to assure that each message received is indeed an authentic message originating from within the system and not a message injected into the network by external foes desiring to interfere with the network or provide false information.

One simple implementation of the message unique identification is to include in $m_{j,i}$ the unique identifications of the origination and destination nodes, j and i respectively and a sequential identifier that can be a numerical identification or a letter. The sequential identifier is incremented every time a message is sent from the originating node j to the destination node i, thus creating a continuum of messages identification. Any message having a sequential identifier which is not in sequence would be considered suspicious by the destination node. Furthermore, two messages having the same identification received within a short time interval would be considered by the receiving mode as the same message sent by two different routes, which can be verified by the receiving nodes by comparing the routing lists of the two messages (which are always included in the hierarchy segment of the structured message 40).

Having described in detail a number of preferred embodiments of the invention, it will now be obvious to those skilled in the art that numerous modifications can be made therein without departing from the scope of the invention as defined in the following claims.

What I claim and desire to secure by Letters Patent in the United States is:

1. A method for dynamically reconfiguring with or without operator intervention, transmission paths in a link layered wireless communication network containing N communication nodes, between said communication nodes so as to optimize such paths between any two communication nodes, said method comprising the steps of:

(A) Assigning to each communication node a permanent identification, j, and N−1 variable link layer levels, $x_{j,i}$, where i is the identification of any other communication node and $x_{j,i}$ is the minimum number of transmissions required to transmit a message from communication node j to communication node i;

(B) Providing each communication node, j, with means for determining its own link layer levels, $x_{j,i}$, and creating its own prioritized routing lists, $R_{j,i}$, to any other communication node, i, with both being updated during a received message or an acknowledgment reception by said communication node j from data attached to such received message or acknowledgment, and;

(C) At any time, routing communications between communication node j, having a link layer level $x_{j,i}$, and communication node i, having a link layer level $x_{i,i}=0$, through $x_{j,i}-1$ communication nodes, having descending link layer levels $x_{k,i}$, when the message is addressed from the communication node j to the communication node i.

2. A method of conveying within a wireless network information about the network's communication hierarchy utilizing for at least part of the communications a structured message having at least a network hierarchy information segment containing a unique identification of an originating communication node j, a destination communication node i and the then current link layer levels $x_{j,i}$, and a message content segment said method comprising the steps of:

(A) Including in the structured message's network hierarchy information segment at least all then current lists $M_u$, where u is any communication node in the network and where each list $M_u$ includes all communication nodes n, for which the link level $x_{u,u}=1$; and/or, (B) Including in the structured message's network hierarchy information segment at least a list of all then effective routing lists $R_{j,i}$ from the originating communication node j, to any other communication node i; and/or (C) Including in the said structured message's hierarchy information segment at least a list of all then effective routing lists $R_{n,m}$ from any communication node n to any other communication node m.

3. The method of claim 1 wherein the means provided for determining a communication node's link layer levels $x_{j,i}$ and creating its routing lists $R_{j,i}$ includes:

(A) a data controller at each communication node for formatting messages for transmission, that includes in each transmitted message the communication node's permanent identification, j, and its link layer levels $x_{j,i}$ at the time of the transmission;

(B) Transceiver means at j, for monitoring a loop for transmitted messages and acknowledgements and for transmitting messages and acknowledgements;

(C) said data controller having embedded in it software algorithms for determining the link layer level hierarchies between itself and all other communication nodes in the network and updating message routing priority lists, $R_{j,i}$ for itself to each other communication node i in the network by:

(i) monitoring the loop for any messages and acknowledgements;
  (ii) determining a destination's permanent identification i, of the message or acknowledgement received as well as the link layer level $x_{k,i}$ of the transmitting communication node;
  (iii) adding to its current routing list $R_{j,i}$ any such transmitting communication node having a link layer level $x_{k,i}$ lower than its own link layer level, $x_{j,i}$;
  (iv) sorting the routing list $R_{j,i}$ by link layer level so that the top of the routing list includes the lowest link layer level of such other communication nodes;
  (v) resetting its own link layer level, $x_{j,i}$, to be the lowest link layer level on the routing list $R_{j,i}$ plus one; and,
  (vi) in the event that its own routing list, $R_{j,i}$ is empty, increment its own link layer level, $x_{j,i}$, by one, then transmit a message destined to communication node i and repeat steps (i) to (v); and,
  (vii) in the event that an acknowlegement of message receipt is past due from a communication node at the top of its routing list, $R_{j,i}$, delete said communication node form said routing list, and then repeat steps (i) to (v) or step (vi).

4. The method of claim 3 wherein the software algorithm for selecting all routing lists $R_{j,i}$ from the originating communication node having the unique identification j to any destination communication node having a unique identification i and determining the originating communication node's link layer levels $x_{j,i}$ includes maintaining at all communication nodes all master lists $M_u$, where u are the unique identifications of any then active communication nodes in the network, including i and j, and where $M_u$ is the set of all communication nodes i for which $x_{u,i}=1$ said method further comprising the steps of:

(A) Selecting all unique identifications, n, that are common to any two master lists $M_u$ and $M_v$, where u and v are any unique identifications including j and i;

(B) Creating from all communication nodes pairs {u,w} where w is any communication node in any master list $M_u$, all the possible linked pairs $L_{u,v}$=;

(C) Creating all chains $C_{j,i}$ of linked pairs $L_{u,v}$ having as their first pair the unique identification j and a unique identification included in $M_j$, and having as their last pair a unique identification included $M_i$ and the unique identification i, and when there are more than a first and a last pair in the chain, having each other pair within the chain $C_{j,i}$ for linked pairs with the pair preceding it and with the pair following it;

(D) From all chains $C_{j,i}$ so formed, selecting a chain $C'_{j,i}$ having the smallest number of pairs; and, (E) Creating a routing list $R_{j,i}$ by selecting the second unique identification in each pair in the chain $C'_{j,i}$ in the order they occupy in the said chain; and, (F) Setting $x_{j,i}$ to be the number of pairs in the chain $C'_{j,i}$.

5. The method of claim 3 wherein the software algorithm for selecting all prioritized routing lists $R_{j,i}$ from an originating communication node having the unique identification j to any destination communication node having a unique identification i and determining the originating communication node's link layer levels $x_{j,i}$ includes maintaining at all communication nodes a list of all then current routing lists $R_{m,n}$ where m and n are the unique identifications of any then active communication node in the network, including i, said method further comprising the steps of:

(A) Selecting all communication nodes k for which $x_{j,k}=1$;

(B) For each communication node j, selecting form all the routing lists $R_{m,n}$ the routing list $R_{k,i}$ containing the lowest number of communication nodes;

(C) Setting the routing lists $R_{j,i}$ to be $R_{j,i}=(k,R_{k,i})$; and, (D) Setting the link layer levels to be $x_{j,i}=x_{k,i}+1$.

6. The method of claim 4 wherein the software algorithm for selecting all prioritized routing lists $R_{j,i}$ from an originating communication node having the unique identification j to any destination communication node having unique identifications i and determining the originating communication node's link layer levels $x_{j,i}$ includes the step of maintaining at all communication nodes a list of all then current routing lists $R_{k,i}$ where k are the unique identifications of all the communication nodes in $M_j$; and, setting the routing lists $R_{j,i}$ to be equal to $(k,R_{k,i})$ and the link layers levels $x_{j,i}$ to be equal to $x_{k,i}+1$.

7. A dynamically self reconfiguring wireless communication network comprising a plurality of communication nodes each having a permanent unique identification and variable link layer levels $x_{j,i}$, said $x_{j,i}$ being the minimum number of transmissions required to retransmit a message from any communication node having a unique identification j to any other communication node having a unique identification i, with each communication node having data transmission and reception means, and each communication node having data control and processing means for determining its own link layer levels $x_{j,i}$ and routing lists $R_{j,i}$ from messages it receives.

8. A method for creating a structured message for use in at least some of the communications in a dynamically self reconfiguring network, having at least an originating communication node having a unique identification j, and at least a destination communication node having a unique identification i, said method comprising the steps of: generating a structured message having a first message segment containing a message content, and generating a second message segment containing network hierarchial information, including at least unique identifications of an originating communication node a destination communication node of said structured message with the originating node having a link layer level $x_{j,i}$, where $x_{j,i}$ is the minimum number of transmissions required to transmit the message between said nodes, and a routing $R_{j,i}$ used in transmitting said message.

9. The method of claim 8 wherein the second message segment containing hierarchial information also contains at least all master list $M_u$, said master lists each containing all unique identifications n of communication nodes having unique identification n for which $x_{u,n}=1$, and u is the unique identification of any communication node.

10. The method of claim 8 wherein the second message segment containing hierarchial information also contains at least all then effective routing lists $R_{m,n}$ between any two communication nodes having unique identifications m and n.

11. The method of claim 8 wherein the second message segment containing hierarchial information also contains at least then effective routing lists $R_{k,i}$ where k are all the unique identifications of communication nodes within a master list $M_j$ of the originating communication node having a unique identification j, and i is the unique identification of any other communication node except the originating communication node and the communication nodes in $M_j$.

12. The method of claim 9 further comprising the steps of sending a structured message form an originating communication node j to any destination node i at predetermined time intervals $t_{j,i}$, if the time from the last communication between the communication nodes j and i exceeds such predetermined time interval $t_{j,i}$ whereby optimal communication paths are maintained in the network.

13. The method of claim 10 further comprising the steps of sending a structured message from an originating communication node j to any destination node i at predetermined time intervals $t_{j,i}$, if the time from the last communication between the communication nodes j and i exceeds such predetermined time interval $t_{j,i}$ whereby optimal communication paths are maintained in the network.

14. The method of claim 11 further comprising the steps of sending a structured message from an originating communication node j to any destination node i at predetermined time intervals $t_{j,i}$, if the time from the last communication between the communication nodes j and i exceeds such predetermined time interval $t_{j,i}$ whereby optimal communication paths are maintained in the network.

15. A dynamically self reconfiguring wireless communication network comprising a plurality of communication nodes each having a permanent unique identification and variable link layer levels $x_{j,i}$, said $x_{j,i}$ being the minimum number of transmissions required to retransmit a message from any communication node having a unique identification j to any other communication node having a unique identification i, each communication node having data transmission and reception means, and each communication node having data control and processing means for determining its own link layer levels $x_{j,i}$ and routing lists $R_{j,i}$ from messages it receives and in which optimal communication paths are maintained by transmitting at predetermined time intervals $t_{j,i}$ messages structured according to claim 9 between any originating node j and any destination node i.

16. A dynamically self reconfiguring wireless communication network comprising a plurality of communication nodes each having a permanent unique identification and variable link layer levels $x_{j,i}$, said $x_{j,i}$ being the minimum number of transmissions required to retransmit a message from any communication node having a unique identification j to any other communication node having a unique identification i, each communication node having data transmission and reception means, and each communication node having data control and processing means for determining its own link layer levels $x_{j,i}$ and routing lists $R_{j,i}$ from messages it receives and in which optimal communication paths are maintained by transmitting at predetermined time intervals $t_{j,i}$ messages structured according to claim 10 between any originating node j and any destination node i.

17. A dynamically self reconfiguring wireless communication network comprising a plurality of communication nodes each having a permanent unique identification and variable link layer levels $x_{j,i}$, said $x_{j,i}$ being the minimum number of transmissions required to retransmit a message from any communication node having a unique identification j to any other communication node having a unique identification i, each communication node having data transmission and reception means, and each communication node having data control and processing means for determining its own link layer levels $x_{j,i}$ and routing lists $R_{j,i}$ from messages it receives and in which optimal communication paths are maintained by transmitting at predetermined time intervals $t_{j,i}$ messages structured according to claim 11 between any originating node j and any destination node i.

18. A method for incorporating a new communication node in the wireless communication network comprising the steps of:

A. Assigning to the new communication node a permanent unique identification j, different from any unique identifications of communication nodes within said network and variable link layer levels, $x_{j,i}$, where i is the unique identification of any other communication node in said network, and $x_{j,i}$ is the minimum number of transmissions required to transmit a message from the new communication node j to any other communication node i in the network, and;

B. Providing said new communication node, j, with means for determining its own link layer levels, $x_{j,i}$, and creating its own prioritized routing lists, $R_{j,i}$, to any other communication node, i, in said network with both being updated during a message or acknowledgment reception by said communication node j from data attached to such received message or acknowledgment, and;

C. At any time, routing communications between the communication node j, having a link layer level $x_{j,i}$, and a communication node i, having a link layer level $x_{i,i}=0$, through $x_{j,i}-1$ transceivers in said network, having descending link layer levels $x_{k,i}$, when the message is addressed from the new communication node j to the communication node i in the network.

19. A method of consolidating into an existing wireless communication network an adjacent wireless communication network both operating at the same transmission frequency comprising the steps of:

A. Assuring that all unique identifications of communication nodes in said adjacent wireless communication network differ from all unique identifications in said wireless existing communication network; and, B. Receiving at least one message at one communication node j in said adjacent wireless communication network originating from at least one communication node i in said existing wireless communication network; and, C. Receiving at least one message at one communication node i in said existing wireless communication originating from at least one communication node j in said adjacent wireless communication network; and, D. From data included in the said received message at the said communication node j in the said adjacent wireless communication network deriving all link layer levels $x_{j,m}$ and all routing list $R_{j,m}$ where m is any unique identification of communication nodes in the said existing wireless communication network by setting all link layer levels $x_{j,m}$ to be $x_{j,m}=x_{i,m}+1$, and by selecting all routing lists $R_{j,m}$ to be $R_{j,m}=(i,R_{i,m})$; and, E. Sending a message from said communication node j in said adjacent wireless communication network to all communication nodes n in said adjacent wireless communication network; and F. From data included in said messages from communication node j in said adjacent wireless communication network to each communication node n in said adjacent wireless communication network set all link layer levels $x_{n,i}$ to be $x_{n,i}=x_{n,j}+x_{j,m}$ and select all routing lists $R_{n,m}$ to be $R_{n,m}=(R_{nj},R_{j,m})$; and G. From data included in the said received message at the said communication node i in said existing wireless communication network deriving all link layer levels $x_{i,n}$ and all routing lists $R_{i,n}$ where n is any unique identification of a communication node in the said adjacent wireless communication network by setting all link layer levels $x_{i,n}$ to be $x_{i,n}=x_{j,n}+1$, and by selecting all routing lists $R_{i,n}$ to be $R_{i,n}=(j,R_{j,n})$; and, H. Sending a message from said communication node i in said existing wireless communication network to all communication nodes m in said existing wireless communication network; and, I. From data included in said messages from communication node i in said existing wireless communication network to each communication node m in said existing wireless communication network setting all link layer levels $x_{m,n}$ to be $x_{m,n}=x_{m,i}+x_{i,n}$ and selecting all routing lists $R_{m,n}$ to be $R_{m,n}=(R_{m,i},R_{i,n})$; and, J. At each communication node in the consolidated wireless communication network, repeating steps (i) to (v) or step (vi) or step (vii) of claim 3 to optimize the routing lists $R_{m,n}$ and $R_{n,m}$.

20. A method of consolidating into an existing wireless communication network an adjacent wireless communication network both operating at the same transmission frequency comprising the steps of:

A. Assuring that all unique identifications of communication nodes in said adjacent wireless communication network differ from all unique identifications in said wireless existing communication network; and, B. Receiving at least one message at one communication node j in said adjacent wireless communication network originating from at least one communication node i in said existing wireless communication network; and, C. Receiving at least one message at one communication node i in said existing wireless communication network originating from at least one communication node j in said adjacent wireless communication network; and, D. From data included in the said received message at the said communication node j in the said adjacent wireless communication network deriving all link layer levels $x_{j,m}$ and all routing lists $R_{j,m}$ where m is any unique identification of communication nodes in the said existing wireless communication network by setting all link layer levels $x_{j,m}$ to be $x_{j,m}=x_{i,m}+1$, and by selecting all routing lists $R_{j,m}$ to be $R_{j,m}=(i,R_{i,m})$; and, E. Sending a message from said communication node j in said adjacent wireless communication network to all communication nodes n in said adjacent wireless communication network; and F. From data included in said messages from communication node j in said adjacent wireless communication network to each communication node n in said adjacent wireless communication network set all link layer levels $x_{n,i}$ to be $x_{n,i}=x_{n,j}+x_{j,m}$ and select all routing lists $R_{n,m}$ to be $R_{n,m}=(R_{n,j},R_{j,m})$; and G. From data included in the said received message at the said communication node i in said existing wireless communication network deriving all link layer levels $x_{i,n}$ and all routing list $R_{i,n}$ where n is any unique identification of a communication node in the said adjacent wireless communication network by setting all link layer levels $x_{i,n}$ to be $x_{i,n}=x_{j,n}+1$, and by selecting all routing lists $R_{i,n}$ to be $R_{i,n}=(j,R_{j,n})$; and, H. Sending a message from said communication node i in said existing wireless communication network to all communication nodes m in said existing wireless communication network; and, I. From data included in said messages from communication node i in said existing wireless communication network to all communication node m in said existing wireless communication network setting all link layer levels $x_{m,n}$ to be $x_{m,n}=x_{m,i}+x_{i,n}$ and selecting all routing lists $R_{m,n}$ to be $R_{m,n}=(R_{m,i},R_{i,n})$; and, J. At each communication node in the consolidated wireless communication network optimizing the routing lists $R_{m,n}$ and $R_{n,m}$. by the method of claim 4.

21. A method of consolidating into an existing wireless communication network an adjacent wireless communication network both operating at the same transmission frequency comprising the steps of:

A. Assuring that all unique identifications of communication nodes in said adjacent wireless communication network differ from all unique identifications in said wireless existing communication network; and, B. Receiving at least one message at one communication node j in said adjacent wireless communication network originating from at least one communication node i in said existing wireless communication network; and, C. Receiving at least one message at one communication node i in said existing wireless communication network originating from at least one communication node j in said adjacent wireless communication network; and, D. From data included in the said received message at the said communication node j in the said adjacent wireless communication network deriving all link layer levels $x_{j,m}$ and all routing lists $R_{j,m}$ where m is any unique identification of communication nodes in the said existing wireless communication network by setting all link layer levels $x_{j,m}$ to be $x_{j,m}=x_{i,m}+1$, and by selecting all routing lists $R_{j,m}$ to be $R_{j,m}=(i,R_{i,m})$; and, E. Sending a message from said communication node j in said adjacent wireless communication network to all communication nodes n in said adjacent wireless communication network; and F. From data included in said messages from communication node j in said adjacent wireless communication network to each communication node n in said adjacent wireless communication network set all link layer levels $x_{n,i}$ to be $x_{n,i}=x_{n,j}+x_{j,m}$ and select all routing lists $R_{n,m}$ to be $R_{n,m}=(R_{n,j},R_{j,m})$; and G. From data included in the said received message at the said communication node i in said existing wireless communication network deriving all link layer levels $x_{i,n}$ and all routing list $R_{i,n}$ where n is any unique identification of a communication node in the said adjacent wireless communication network by setting all link layer levels $x_{i,n}$ to be $x_{i,n}=x_{j,n}+1$, and by selecting all routing lists $R_{i,n}$ to be $R_{i,n}=(j,R_{j,n})$; and, H. Sending a message from said communication node i in said existing wireless communication network to all communication nodes m in said existing wireless communication network; and, I. From data included in said messages from communication node i in said existing wireless communication network to all communication node m in said existing wireless communication network setting all link layer levels $x_{m,n}$ to be $x_{m,n}=x_{m,i}+x_{i,n}$ and selecting all routing lists $R_{m,n}$ to be $R_{m,n}=(R_{m,i},R_{i,n})$; and, J. At each communication node in the consolidated wireless communication network optimizing the routing lists $R_{m,n}$ and $R_{n,m}$. by the method of claim 5.

22. A method of consolidating into an existing wireless communication network an adjacent wireless communication network both operating at the same transmission frequency comprising the steps of:

A. Assuring that all unique identifications of communication nodes in said adjacent wireless communication network differ from all unique identifications in said wireless existing communication network; and, B. Receiving at least one message at one communication node j in said adjacent wireless communication network originating from at least one communication node i in said existing wireless communication network; and, C. Receiving at least one message at one communication node i in said existing wireless communication network originating from at least one communication node j in said adjacent wireless communication network; and, D. From data included in the said received message at the said communication node j in the said adjacent wireless communication network deriving all link layer levels $x_{j,m}$ and all routing lists $R_{j,m}$ where m is any unique identification of communication nodes in the said existing wireless communication network by setting all link layer levels $x_{j,m}$ to be $x_{j,m}=x_{i,m}+1$, and by selecting all routing lists $R_{j,m}$ to be $R_{j,m}=(i,R_{i,m})$; and, E. Sending a message from said communication node j in said adjacent wireless communication network to all communication nodes n in said adjacent wireless communication network; and F. From data included in said messages from communication node j in said adjacent wireless communication network to each communication node n in said adjacent wireless communication network set all link layer levels $x_{n,i}$ to be $x_{n,i}=x_{n,j}+x_{j,m}$ and select all routing lists $R_{n,m}$ to be $R_{n,m}=(R_{n,j},R_{j,m})$; and G. From data included in the said received message at the said communication node i in said existing wireless communication network deriving all link layer levels $x_{i,n}$ and all routing list $R_{i,n}$ where n is any unique identification of a communication node in the said adjacent wireless communication network by setting all link layer levels $x_{i,n}$ to be $x_{i,n}=x_{j,n}+1$, and by selecting all routing lists $R_{i,n}$ to be $R_{i,n}=(j,R_{j,n})$; and, H. Sending a message from said communication node i in said existing wireless communication network to all communication nodes m in said existing wireless communication network; and, I. From data included in said messages from communication node i in said existing wireless communication network to all communication node m in said existing wireless communication network setting all link layer levels $x_{m,n}$ to be $x_{m,n}=x_{m,i}+x_{i,n}$ and selecting all routing lists $R_{m,n}$ to be $R_{m,n}=(R_{m,i},R_{i,n})$; and, J. At each communication node in the consolidated wireless communication network optimizing the routing lists $R_{m,n}$ and $R_{n,m}$. by the method of claim 6.

23. A method for converting a self reconfiguring wireless communication network to a network having only a subset of communication nodes having unique identifications, d, as possible destination nodes for all other communication nodes in the network, while said subset of communication nodes having unique identifications, d, maintains the ability to use as destinations nodes all communications nodes in the network, comprising the steps of:

A. Transmitting a message from at least one of said communication nodes having unique identifications, d, to all communication nodes having unique identifications, s, which are not in said subset; and B. In said message providing a list of all said comminication nodes having unique identifications, s; and, C. In said message providing a directive removing from the then current routing lists at each communication node, j, which does not have one of the unique identifications, d, all routing lists $R_{j,s}$.

24. The wireless communication network of claim 7 in which only a subset of communication nodes having unique identifications, d, can act as destination nodes to all other communication nodes.

25. The wireless communication network of claim 24, where the subset of communication nodes having unique identifications, d, consists at any given time of a single communication node, the network's central communication node.

26. A method of shifting the central communication node functions in a wireless communication network of claim 25 from a then central communication node having a unique identification, d, to any one of other potential central communication nodes having unique identifications, e, comprising the steps of:
   A. Maintaining at all communication nodes, j, routing lists $R_{j,d}$ and $R_{j,e}$ to all possible central communication nodes having unique identifications, d for the then central communication node, and e for the potential central communication nodes; and
   B. Transmitting a message from said central communication node having the unique identification, d, to all communication nodes in the network; and,
   C. In said message providing a directive removing from the then current routing lists at each communication node, j, the routing lists $R_{j,d}$ and establish as the only routing lists at each communication j, the routing lists $R_{j,e}$ where e is the unique identification of the new central communication node.

27. The wireless self reconfiguring communication network of claim 24 wherein the functions of the central communication node can be shifted to any one communication node of a predetermined subset of the communication nodes in the network.

28. A method of switching on and off the repeating function of at least one communication node having a unique identification, m, in a self reconfiguring wireless network, comprising the steps of:
   A. Assigning to said communication node having a unique identification m, a repeater function, R, with the values "On" and "Off"; and,
   B. Setting the value of R to "On" when said communication node acts as a repeater and to "Off" when said communication node's repeater function is deactivated; and
   C. In all messages transmitted by said communication node m, including the status of the function R in the message's network hierarchy segment; and,
   D. Transmitting a message from the communication node m to all communication nodes in the network whenever a change in the status of the function R occurs; and
   E. At any communication node j in the network selecting only routing lists $R_{j,i}$ having as their elements communication nodes that do not have an R function or with their R function having a value "On", except that the destinations nodes, i, can be any communication node in the network.

29. The wireless communication network of claim 7 in which at least a subset of the communication node can have repeater function R deactivated at least some of the time.

30. The wireless communication network of claim 29 wherein said subset comprises mobile communication nodes that can be immobilized, said mobile communication nodes having their R function "Off" when mobile and "On" when immobilized.

31. The method of claim 4 further comprising the step of selecting between different routing lists $R_{j,i}$ to transmit a message from an originating node j to a destination node i, for which $x_{j,i}$ are equal, a preferred routing list $R'_{j,i}$ by selecting the routing list for which the signal received by the originating node from the first node on the routing list is strongest.

32. The method of claims 5 or 6 further comprising the step of selecting between different routing lists $R_{j,i}$ to transmit a message from an originating node j to a destination node i, for which $x_{j,i}$ are equal, a preferred routing list $R'_{j,i}$ selecting the routing list $(k, R_{k,i})$ for which the signal received by the originating node from the node k is strongest.

33. The wireless self reconfiguring communication network of claim 7 in which a preferred routing list is determined by selecting the shortest list with the strongest reception.

34. A method of consolidating a plurality of wireless communication sub networks as in claim 25, each operating at transmission frequencies that are not necessarily the same, into a single wireless communication network in which all communication nodes can communicate with each other comprising the steps of:
   A. Providing the central communication node in each of said sub networks with a frequency agile transceiver capable of operating at least at the said sub network frequency and at another frequency; and
   B. Establishing routing lists between all the central communication nodes of the sub networks and creating from said central communication nodes a principal network of claim 7, in which messages are transmitted at the said another frequency, the principal network's frequency; and,
   C. Routing all messages within the sub network as if the sub network were a network of claim 7 at said sub network operating frequency; and
   D. Routing all messages whose originating node and destination nodes are in different sub networks, first to the central communication node of the originating node's sub network at the said sub network frequency, then transmitting said message at the principal network frequency to the central communication node of the sub network to which the destination node belongs, and then transmitting said message to the destination node at the destination node's sub network frequency; and
   E. Maintaining at all central communication nodes a list of all communication nodes in the network including with each its unique identification and the designation of its sub network.

35. A wireless self reconfiguring communication network of a plurality of geographically incongruent sub networks of claim 7, each operating at frequencies that are not necessarily the same, each sub network of claim 7, having at least one communication node having a frequency agile transceiver capable of operating at its sub network frequency and at another frequency, the principal network frequency.

36. The network of claim 35 wherein some of the sub networks that operate at different frequencies from each other are geographically congruent.

37. A method of providing in a wireless communication network at least one network wide directive that is implemented simultaneously throughout the network comprising the steps of:
   A. Providing each communication node in the network with means for determining a network wide synchronous time; and
   B. at a given time $t_0$, transmitting a message to all communication nodes in the network which includes said at least one directive with a command to implement said at least one directive at a future time $t_1$, so that the time interval $t_1-t_0$ is larger than the time interval required for the message to be received by all communication nodes in the network.

38. The method of claim 37 wherein the means for determining a network wide synchronous time is a global positioning system receiving its time signal from dedicated satellites.

39. The wireless communication network of claim 7 in which at least one directive can be implemented simultaneously within the network.

40. The wireless communication network of claim 11 wherein said at least one directive is a change in an encryption algorithm.

41. The wireless communication network of claim 40 wherein a network wide encryption algorithm can be changed at predetermined time intervals.

42. A wireless communication network of claim 40 where the time intervals between changes in encryption algorithms is a variable that depends at least partially on communication patterns experienced by the network in a most recent predetermined time interval.

43. A wireless communication network of claim 40 where the encryption algorithm is at least partially determined from communication patterns experienced by the network in a most recent predetermined time interval.

44. A method for authenticating the origin of a message in a wireless communication network comprising the steps of:

A. Assigning to each message a unique identification, $m_{j,i}$ where j is the unique identification of the originating node and i the unique identification of the destination node, and $m_{j,i}$ includes j and i and a sequential identifier; and, B. Including in the hierarchy segment of said message the unique identification $m_{ij}$ of said message; and, C. Incrementing the sequential identifier with each transmission from said originating node j to said destination node i; and, D. Comparing at the destination node i the message's sequential identifier to the sequential identifier of the most recent message from originating node j; and, E. Declaring as non authentic any messages that have no message unique identification, or have incorrect identification or in which the sequential identifier is out of sequence.

45. The method of claim 1 further comprising steps for improving critical message reception at the destination node i, from an origination node j under an adverse environment said steps comprising:

(A) Transmitting a critical message from the originating node j to a destination node i through at least two routing lists $R_{j,i}$ and $R'_{j,i}$ where the link layer levels $x_{j,i}$ and $x'_{j,i}$ associated with the routing $R_{j,i}$ and $R'_{j,i}$ respectively, obey the relationship $x'_{j,i}=x_{j,i}+1$, including in the said critical message a hierarchy segment with a unique message identification $m_{j,i}$ which is independent of the routing selected for said critical message; and, (B) At the destination node i, discarding any message for which a prior message having said unique message identification $m_{j,i}$ has been received.

46. The network of claim 25 in which the central communication node is associated with an energy management system capable of providing directives to remote communication nodes' to activate or deactivate local equipment in response to inputs transmitted from said local equipment to the central communication node.

47. The network of claim 25 in which the central communication node is associated with a process control system capable of providing directive to remote communication nodes' to activate or deactivate local equipment in response to inputs transmitted from said local equipment to the central communication node.

48. The network of claim 46 wherein each communication node contains a transceiver operating at infrared frequencies.

49. The network of claim 47 wherein the communication node contains a transceiver operating at infrared frequencies.

50. A data controller for storing a structured message comprising:

a memory apparatus a structured message for use in at least some of the communications in a dynamically self reconfiguring network, having at least an originating communication node having a unique identification j, and at least a destination communication node having a unique identification I, such structured message comprising at least two segments, a first message segment being a message content segment and a second message segment containing network hierarchial information, including at least the unique identifications of the originating communication node and the destination communication node of said structured message, with the originating node's link layer level being $x_{j,i}$, where $x_{j,i}$ is the minimum number of transmissions required to transmit the structured message between said nodes, and the routing $R_{j,i}$ used in transmitting said structured message, said structured message being stored in said memory apparatus for subsequent transmission.

51. A method for creating and using a structured message for use in at least some of the communications in a dynamically self reconfiguring network, having at least an originating communication node having a unique identification j, and at least a destination communication node having a unique identification i, said method comprising the steps of: generating a structured message having a first message segment containing a message content, and generating a second message segment containing network hierarchial information, including at least unique identifications of an originating communication node and a destination communication node of said structured message with the originating node having a link layer level $x_{j,i}$, where $x_{j,i}$ is the minimum number of transmissions required to transmit the message between said nodes, and a routing $R_{j,i}$ used in transmitting said message, said second message segment also containing at least then effective routing lists $R_{k,i}$ where k are all the unique identifications of communication nodes within a master list $M_j$ of the originating communication node having a unique identification j, and i is the unique identification of any other communication node except the originating communication node and the communication nodes in $M_j$, and sending the structured message from an originating communication node j to any destination node i at predetermined time intervals $t_{j,i}$, if the time from the last communication between the communication nodes j and I exceeds such predetermined time interval $t_{j,i}$ whereby optimal communication paths are maintained in the network and determining a new communication node's link layer levels $X_{j,i}$ and its routing lists $R_{j,i}$ according to the method of claim 1.

52. A method for creating and using a structured message for use in at least some of the communications in a dynamically self reconfiguring network, having at least an originating communication node having a unique identification j, and at least a destination communication node having a unique identification i, said method comprising the steps of: generating a structured message having a first message segment containing a message content, and generating a second message segment containing network hierarchial information, including at least unique identifications of an originating communication node and a destination communication node of said structured message with the originating node having a link layer level $x_{j,i}$, where $x_{j,i}$ is the minimum number of transmissions required to transmit the message between said nodes, and a routing $R_{j,i}$ used in transmitting said message, said second message segment also containing at least then effective routing lists $R_{k,i}$ where k are all the unique identifications of communication nodes within a master list $M_j$ of the originating communication node having a unique identification j, and i is the unique identification of any other communication node except the originating communication node and the communication nodes in $M_j$, and sending the structured message from an originating communication node j to any destination node i at predetermined time intervals $t_{j,i}$, if the time from the last communication between the communication nodes j and I exceeds such predetermined time interval $t_{j,i}$ whereby optimal communication paths are maintained in the network and determining a new communication node's link layer levels $X_{j,i}$ and its routing lists $R_{j,i}$ according to the method of claim 3.

53. A method for creating and using a structured message for use in at least some of the communications in a dynamically self reconfiguring network, having at least an originating communication node having a unique identification j, and at least a destination communication node having a unique identification i, said method comprising the steps of: generating a structured message having a first message segment containing a message content, and generating a second message segment containing network hierarchial information, including at least unique identifications of an originating communication node and a destination communication node of said structured message with the originating node having a link layer level $x_{j,i}$, where $x_{j,i}$ is the minimum number of transmissions required to transmit the message between said nodes, and a routing $R_{j,i}$ used in transmitting said message, said second message segment also containing at least then effective routing lists $R_{k,i}$ where k are all the unique identifications of communication nodes within a master list $M_j$ of the originating communication node having a unique identification j, and i is the unique identification of any other communication node except the originating communication node and the communication nodes in $M_j$, and sending the structured message from an originating communication node j to any destination node i at predetermined time intervals $t_{j,i}$, if the time from the last communication between the communication nodes j and I exceeds such predetermined time interval $t_{j,i}$ whereby optimal communication paths are maintained in the network and determining a new communication node's link layer levels $X_{j,i}$ and its routing lists $R_{j,i}$ according to the method of claim 4.

54. A method for creating and using a structured message for use in at least some of the communications in a dynamically self reconfiguring network, having at least an originating communication node having a unique identification j, and at least a destination communication node having a unique identification i, said method comprising the steps of: generating a structured message having a first message segment containing a message content, and generating a second message segment containing network hierarchial information, including at least unique identifications of an originating communication node and a destination communication node of said structured message with the originating node having a link layer level $x_{j,i}$, where $x_{j,i}$ is the minimum number of transmissions required to transmit the message between said nodes, and a routing $R_{j,i}$ used in transmitting said message, said second message segment also containing at least then effective routing lists $R_{k,i}$ where k are all the unique identifications of communication nodes within a master list $M_j$ of the originating communication node having a unique identification j, and i is the unique identification of any other communication node except the originating communication node and the communication nodes in $M_j$, and sending the structured message from an originating communication node j to any destination node i at predetermined time intervals $t_{j,i}$, if the time from the last communication between the communication nodes j and I exceeds such predetermined time interval $t_{j,i}$ whereby optimal communication paths are maintained in the network and determining a new communication node's link layer levels $X_{j,i}$ and its routing lists $R_{j,i}$ according to the method of claim 5.

55. A method for creating and using a structured message for use in at least some of the communications in a dynamically self reconfiguring network, having at least an originating communication node having a unique identification j, and at least a destination communication node having a unique identification i, said method comprising the steps of: generating a structured message having a first message segment containing a message content, and generating a second message segment containing network hierarchial information, including at least unique identifications of an originating communication node and a destination communication node of said structured message with the originating node having a link layer level $x_{j,i}$, where $x_{j,i}$ is the minimum number of transmissions required to transmit the message between said nodes, and a routing $R_{j,i}$ used in transmitting said message, said second message segment also containing at least then effective routing lists $R_{k,i}$ where k are all the unique identifications of communication nodes within a master list $M_j$ of the originating communication node having a unique identification j, and i is the unique identification of any other communication node except the originating communication node and the communication nodes in $M_j$, and sending the structured message from an originating communication node j to any destination node i at predetermined time intervals $t_{j,i}$, if the time from the last communication between the communication nodes j and I exceeds such predetermined time interval $t_{j,i}$ whereby optimal communication paths are maintained in the network and determining a new communication node's link layer levels $X_{j,i}$ and its routing lists $R_{j,i}$ according to the method of claim 6.

56. The network of claim 52 in which local equipments at the remote communication nodes comprises a plurality of security detectors and annunciators and wherein the network is a security network.

57. The network of claim 54 in which local equipments at the remote communication nodes comprises a plurality of security detectors and annunciators and wherein the network is a security network.

58. The network of claim 52 in which local equipments at the remote communication nodes comprises a plurality of sensors and actuators and wherein the network is an energy management system.

59. The network of claim 54 in which local equipments at the remote communication nodes comprises a plurality of sensors and actuators and wherein the network is an energy management system.

60. The data controller of claim 50 wherein the structured message hierarchial information segment also contains at least all master list $M_u$, said master lists each containing all unique identifications n of communication nodes having unique identification n for which $x_{u,n}=1$, and u is the unique identification of any communication node.

61. The data controller of claim 50 wherein the structured message hierarchial information segment also contains at least all the then effective routing lists $R_{m,n}$ between any two communication nodes having unique identifications m and n.

62. The data controller of claim 50 wherein the structured message hierarchial information segment also contains at least the then effective routing lists $R_{k,i}$ where k are all the unique identifications of communication nodes within the master list $M_j$ of the originating communication node having a unique identification j, and i is the unique identification of any other communication node except the originating communication and the communication nodes in $M_j$.

* * * * *